US012396061B2

United States Patent
Vesely et al.

(10) Patent No.: US 12,396,061 B2
(45) Date of Patent: Aug. 19, 2025

(54) RAN-5GC INTERACTIONS FOR SESSION JOIN, SESSION START, SESSION LEAVE, SESSION STOP, AND SESSION DELETE FOR 5G MULTICAST BROADCAST SERVICES

(71) Applicant: Telefonaktiebolaget LM Ericsson (publ), Stockholm (SE)

(72) Inventors: Alexander Vesely, Feldbach (AT); Hans Bertil Rönneke, Kungsbacka (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 442 days.

(21) Appl. No.: 17/910,845

(22) PCT Filed: Mar. 23, 2021

(86) PCT No.: PCT/IB2021/052410
§ 371 (c)(1),
(2) Date: Sep. 12, 2022

(87) PCT Pub. No.: WO2021/191802
PCT Pub. Date: Sep. 30, 2021

(65) Prior Publication Data
US 2023/0096763 A1   Mar. 30, 2023

Related U.S. Application Data

(60) Provisional application No. 62/993,458, filed on Mar. 23, 2020.

(51) Int. Cl.
*H04W 76/40* (2018.01)
*H04L 12/18* (2006.01)
(Continued)

(52) U.S. Cl.
CPC ............. *H04W 76/40* (2018.02); *H04W 4/06* (2013.01); *H04W 76/11* (2018.02); *H04L 12/189* (2013.01)

(58) Field of Classification Search
CPC ....... H04W 76/40; H04W 76/11; H04W 4/06; H04W 36/0007; H04W 72/30; H04L 12/189
See application file for complete search history.

(56) References Cited

U.S. PATENT DOCUMENTS

2017/0339609 A1* 11/2017 Youn ...................... H04W 76/11
2018/0376444 A1* 12/2018 Kim ....................... H04W 76/30
(Continued)

FOREIGN PATENT DOCUMENTS

WO    2020002374 A1    1/2020

OTHER PUBLICATIONS

U.S. Appl. No. 62/975,858 (Year: 2020).*
(Continued)

*Primary Examiner* — Rushil P. Sampat
(74) *Attorney, Agent, or Firm* — Sonoda & Kobayashi Intellectual Property Law; Sarvajit S. Patil

(57) ABSTRACT

Systems and methods related to core network and radio access network (RAN) interactions for a Multicast/Broadcast (MB) session are disclosed herein. In one embodiment, a method performed by an Access and Mobility Management Function (AMF) for a MB session join procedure includes receiving a MB session join request from a User Equipment (UE) via a RAN node, the MB session join request being a request to join a particular MB session. The method further includes determining that the MB session join request is permitted by a subscription of the UE, selecting a MB Session Management Function (MB-SMF) based on information included in the MB session join
(Continued)

request, communicating with the MB-SMF to create a MB session context in the AMF and an MB session context in the MB-SMF, and sending a MB session join accept message to the UE.

17 Claims, 15 Drawing Sheets

(51) Int. Cl.
  *H04W 4/06* (2009.01)
  *H04W 76/11* (2018.01)

(56) References Cited

U.S. PATENT DOCUMENTS

| | | | |
|---|---|---|---|
| 2019/0223250 A1* | 7/2019 | Dao | H04W 72/23 |
| 2020/0228936 A1* | 7/2020 | Talebi Fard | H04W 4/08 |
| 2020/0351984 A1* | 11/2020 | Talebi Fard | H04W 76/40 |
| 2023/0345310 A1* | 10/2023 | Li | H04W 4/06 |

OTHER PUBLICATIONS

Author Unknown, "Technical Specification Group Services and System Aspects; Multimedia Broadcast/Multicast Service (MBMS); Architecture and functional description (Release 16)," Technical Specification 23.246, Version 16.1.0, Sep. 2019, 3GPP Organizational Partners, 77 pages.

Author Unknown, "Technical Specification Group Services and System Aspects; System architecture for the 5G System (5GS); Stage 2 (Release 16)," Technical Specification 23.501, Version 16.3.0, Dec. 2019, 3GPP Organizational Partners, 410 pages.

Author Unknown, "Technical Specification Group Services and System Aspects; Procedures for the 5G System (5GS); Stage 2 (Release 16)," Technical Specification 23.502, Version 16.3.0, Dec. 2019, 3GPP Organizational Partners, 552 pages.

Author Unknown, "Technical Specification Group Services and System Aspects; Study on architectural enhancements for 5G multicast-broadcast services (Release 17)," Technical Specification 23.757, Version 0.3.0, Jan. 2020, 3GPP Organizational Partners, 37 pages.

Author Unknown, "Technical Specification Group Radio Access Network; NR; NR and NG-RAN Overall Description; Stage 2 (Release 16)," Technical Specification 38.300, Version 16.0.0, Dec. 2019, 3GPP Organizational Partners, 101 pages.

Invitation to Pay Additional Fees and Partial Search for International Patent Application No. PCT/IB2021/052410, mailed Jun. 24, 2021, 17 pages.

International Search Report and Written Opinion for International Patent Application No. PCT/IB2021/052410, mailed Aug. 18, 2021, 23 pages.

Written Opinion for International Patent Application No. PCT/IB2021/052410, mailed Feb. 9, 2022, 12 pages.

International Preliminary Report on Patentability for International Patent Application No. PCT/IB2021/052410, mailed May 4, 2022, 36 pages.

* cited by examiner

US 12,396,061 B2

RAN-5GC INTERACTIONS FOR SESSION JOIN, SESSION START, SESSION LEAVE, SESSION STOP, AND SESSION DELETE FOR 5G MULTICAST BROADCAST SERVICES

RELATED APPLICATIONS

This application is a 35 U.S.C. § 371 national phase filing of International Application No. PCT/IB2021/052410, filed Mar. 23, 2021, which claims the benefit of provisional patent application Ser. No. 62/993,458, filed Mar. 23, 2020, the disclosures of which are hereby incorporated herein by reference in their entireties.

TECHNICAL FIELD

The present disclosure relates to Multicast Broadcast Services (MBS) in a cellular communications system.

BACKGROUND

Third Generation Partnership Project (3GPP) has developed the Multicast/Broadcast Multimedia Subsystem (MBMS) (see 3GPP Technical Specification (TS) 23.246 v16.1.0) for Third Generation (3G) networks for video multicast/broadcasting and streaming services and later introduced the evolved MBMS (eMBMS) for the Evolved Packet System (EPS). In Release 13 and Release 14, the MBMS system was updated to support new services such as Public Safety, Cellular Internet of Things (CIoT), and Vehicle to Everything (V2X).

The scope of a new Release 17 study in 3GPP SA2 working group is to study both multicast requirements and use cases for CIoT, Public Safety, V2X, etc., and dedicated broadcasting requirements and use cases. The study targets the Fifth Generation (5G) Release 17 and the New Radio (NR) radio access. The study results so far have been documented in 3GPP Technical Report (TR) 23.757 V0.3.0.

There currently exist certain challenge(s). Multicast/broadcast services are not currently supported on 5G NR. With the enhanced characteristics of the 5G NR, e.g. short delays, bandwidth, etc., it is believed Mission Critical Services (e.g., Mission Critical Push To Talk (MCPTT), Mission Critical Data (MCData), and Mission Critical Video (MCVideo)), as well as V2X services, will show an enhanced and much better performance on 5G NR. As such, there is a need for systems and methods for supporting multicast/broadcast services in 5G NR.

SUMMARY

Systems and methods related to core network and radio access network (RAN) interactions for a Multicast/Broadcast (MB) session are disclosed herein. In one embodiment, a method performed by an Access and Mobility Management Function (AMF) for a MB session join procedure comprises receiving a MB session join request from a User Equipment (UE) via a RAN node, the MB session join request being a request to join a particular MB session. The method further comprises determining that the MB session join request is permitted by a subscription of the UE, selecting a MB Session Management Function (MB-SMF) based on information comprised in the MB session join request, communicating with the MB-SMF to create a MB session context in the AMF and an MB session context in the MB-SMF, and sending a MB session join accept message to the UE.

In one embodiment, the MB session join request comprises a MB session identity (ID) of the particular MB session, and selecting the MB-SMF comprises selecting the MB-SMF based on the MB session ID. In one embodiment, the MB session ID is a Temporary Mobile Group Identity (TMGI) associated to the particular MB session.

In one embodiment, the method further comprises storing an identifier of the particular MB session, as a joined MB session, to a UE context of the UE stored at the AMF.

In one embodiment, the method further comprises allocating an identity used to page the UE when the UE is in an idle state when a specific service associated to the particular MB session starts. In one embodiment, the allocated identity is a TMGI associated to the particular MB session or a group page identity associated to the TMGI. In one embodiment, the method further comprises storing the allocated identity in either the MB session context or a UE context of the UE stored at the AMF.

In one embodiment, the method further comprises determining whether the UE is authorized to join the MB session. In one embodiment, determining whether the UE is authorized to join the MB session comprises providing a UE ID of the UE and a MB session ID of the particular MB session to the MB-SMF.

In one embodiment, the MB session context in the MB-SMF comprises information that indicates the AMF.

In one embodiment, the MB session join procedure does not involve setup of individual user plane resources for the UE.

Corresponding embodiments of an AMF for a MB session join procedure are also disclosed. In one embodiment, an AMF for a MB session join procedure is adapted to receive a MB session join request from a UE via a RAN node, the MB session join request being a request to join a particular MB session. The AMF is further adapted to determine that the MB session join request is permitted by a subscription of the UE, select a MB-SMF based on information comprised in the MB session join request, communicate with the MB-SMF to create a MB session context in the AMF and a MB session context in the MB-SMF, and send a MB session join accept message to the UE.

In one embodiment, a network node that implements an AMF for a MB session join procedure comprises processing circuitry configured to cause the network node to receive a MB session join request from a UE via a RAN node, the MB session join request being a request to join a particular MB session. The processing circuitry is further configured to cause the network node to determine that the MB session join request is permitted by a subscription of the UE, select a MB-SMF based on information comprised in the MB session join request, communicate with the MB-SMF to create a MB session context in the AMF and a MB session context in the MB-SMF, and send a MB session join accept message to the UE.

Embodiments of a method performed by a MB-SMF for a MB session join procedure are also disclosed. In one embodiment, a method performed by a MB-SMF for a MB session join procedure comprises communicating with an AMF to create a MB session context in the MB-SMF during a join procedure in which a UE joins a particular MB session, the MB session context comprising information that indicates the AMF.

In one embodiment, the method further comprises receiving, from the AMF, a UE ID of the UE and a MB session ID of the particular MB session, determining whether the UE is authorized to join the particular MB session based on the UE ID and the MB session ID, and sending a response to the AMF that indicates whether the UE is authorized to join the particular MB session. In one embodiment, determining whether the UE is authorized to join the particular MB session comprises determining whether a request for the UE to join the particular MB session is compliant with a subscription associated to the UE and with local policies, or determining whether the UE is eligible to join a service associated with the MB session ID of the particular MB session, or determining whether the UE is located within a service area in which UEs are eligible to join the particular MB session, based on a location of the UE.

In one embodiment, the method further comprises receiving, from the AMF, a UE ID of the UE and a MB session ID of the particular MB session, sending, towards an application server, a message comprising the UE ID and the MB session ID to request authorization, receiving, from the application server, a response that indicates whether the UE is authorized to join the particular MB session, and sending the response to the AMF.

Corresponding embodiments of a MB-SMF for MB session join procedure are also disclosed. In one embodiment, a MB-SMF for a MB session join procedure is adapted to communicate with an AMF to create a MB session context in the MB-SMF during a join procedure in which a UE joins a particular MB session, the MB session context comprising information that indicates the AMF.

In one embodiment, a network node that implements a MB-SMF for a MB session join procedure comprises processing circuitry configured to cause the network node to communicate with an AMF to create a MB session context in the MB-SMF during a join procedure in which a UE joins a particular MB session, the MB session context comprising information that indicates the AMF.

Embodiments of a method performed by a RAN node for a MB session join procedure are also disclosed. In one embodiment, a method performed by a RAN node for a MB session join procedure comprises receiving a MB session join request from a UE, the MB session join request being a request to join a particular MB session. The method further comprises sending the MB session join request to an AMF, receiving a MB session join accept message from the AMF, and sending the MB session join accept message to the UE. The RAN node receives, in association with interactions for the MB session, an identity associated with the joined MB session, and the method further comprises storing the received identity in a RAN UE context for the UE.

Corresponding embodiments of a RAN node for a MB session join procedure are also disclosed. In one embodiment, a RAN node for a MB session join procedure is adapted to receive a MB session join request from a UE, the MB session join request being a request to join a particular MB session. The RAN node is further adapted to send the MB session join request to an AMF, receive a MB session join accept message from the AMF, and send the MB session join accept message to the UE. The RAN node receives, in association with interactions for the MB session, an identity associated with the joined MB session, and the RAN node is further adapted to store the received identity in a RAN UE context for the UE.

In one embodiment, a RAN node for a MB session join procedure comprises processing circuitry configured to cause the RAN node to receive a MB session join request from a UE, the MB session join request being a request to join a particular MB session. The processing circuitry is further configured to cause the RAN node to send the MB session join request to an AMF, receive a MB session join accept message from the AMF, and send the MB session join accept message to the UE. The RAN node receives, in association with interactions for the MB session, an identity associated with the joined MB session, and the processing circuitry is further configured to cause the RAN node to store the received identity in a RAN UE context for the UE.

Embodiments of a method performed by an AMF for a MB session start procedure are also disclosed. In one embodiment, a method performed by an AMF for a MB session start procedure comprises receiving a MB session start request from a MB-SMF, the MB session start request being a request to start a particular MB session. The method further comprises, responsive to receiving the MB session start request from the MB-SMF, performing group paging in one or more registration areas of one or more UEs that have an association to the particular MB session. The method further comprises receiving an MBS service request from a UE via a RAN node responsive to performing the group paging, sending a MB session resource setup request to the RAN node, receiving a MB session resource setup response from the RAN node that indicates successful establishment of resources, and sending an MB session start acknowledge to the MB-SMF.

In one embodiment, the method further comprises, responsive to receiving the MBS service request from the UE, sending, to the MB-SMF, a request to setup of the particular MB session.

In one embodiment, the MBS service request received from the UE comprises information that indicates the particular MB session that triggered the group paging.

Corresponding embodiments of an AMF for a MB session start procedure are also disclosed. In one embodiment, an AMF for a MB session start procedure is adapted to receive a MB session start request from a MB-SMF, the MB session start request being a request to start a particular MB session. The AMF is further adapted to, responsive to receiving the MB session start request from the MB-SMF, perform group paging in one or more registration areas of one or more UEs that have an association to the particular MB session. The AMF is further adapted to receive an MBS service request from a UE via a RAN node responsive to performing the group paging, send a MB session resource setup request to the RAN node, receive a MB session resource setup response from the RAN node that indicates successful establishment of resources, and send an MB session start acknowledge to the MB-SMF.

In one embodiment, a network node for implementing an AMF for a MB session start procedure comprises processing circuitry configured to cause the network node to receive a MB session start request from a MB-SMF, the MB session start request being a request to start a particular MB session. The processing circuitry is further configured to cause the network node to, responsive to receiving the MB session start request from the MB-SMF, perform group paging in one or more registration areas of one or more UEs that have an association to the particular MB session. The processing circuitry is further configured to cause the network node to receive an MBS service request from a UE via a RAN node responsive to performing the group paging, send a MB session resource setup request to the RAN node, receive a MB session resource setup response from the RAN node that indicates successful establishment of resources, and send an MB session start acknowledge to the MB-SMF.

Embodiments of a method performed by a MB-SMF for a MB session start procedure are also disclosed herein. In one embodiment, a method performed by a MB-SMF for a MB session start procedure comprises receiving a MB session start request, the MB session start request being a request to start a particular MB session. The method further comprises sending the MB session start request to an AMF.

Embodiments of a method performed by a RAN node for a MB session start procedure are also disclosed. In one embodiment, a method performed by a RAN node for a MB session start procedure comprises receiving, from an AMF, a group paging request comprising a group paging ID of a group of UEs having an association to a particular MB session. The method further comprises performing group paging for the group of UEs responsive to receiving the group paging request and receiving a MBS service request from a UE responsive to the group paging, the MBS service request comprising a reference to the particular MB session. The method further comprises forwarding the MBS service request to the AMF, receiving a MB session resource setup request from the AMF for the particular MB session, establishing either point-to-point (PTP) or Point-to-Multipoint (PTM) resources for the MB session, and sending a MB session resource setup response to the AMF.

Corresponding embodiments of a RAN node for a MB session start procedure are also disclosed. In one embodiment, a RAN node for a MB session start procedure is adapted to receive, from an AMF, a group paging request comprising a group paging ID of a group of UEs having an association to a particular MB session. The RAN node is further adapted to perform group paging for the group of UEs responsive to receiving the group paging request and receive a MBS service request from a UE responsive to the group paging, the MBS service request comprising a reference to the particular MB session. The RAN node is further adapted to forward the MBS service request to the AMF, receive a MB session resource setup request from the AMF for the particular MB session, establish either PTP or PTM resources for the MB session, and send a MB session resource setup response to the AMF.

In one embodiment, a RAN node for a MB session start procedure comprises processing circuitry configured to cause the RAN node to receive, from an AMF, a group paging request comprising a group paging ID of a group of UEs having an association to a particular MB session. The processing circuitry is further configured to cause the RAN node to perform group paging for the group of UEs responsive to receiving the group paging request and receive a MBS service request from a UE responsive to the group paging, the MBS service request comprising a reference to the particular MB session. The processing circuitry is further configured to cause the RAN node to forward the MBS service request to the AMF, receive a MB session resource setup request from the AMF for the particular MB session, establish either PTP or PTM resources for the MB session, and send a MB session resource setup response to the AMF.

Embodiments of a method performed by a RAN node for a MB session leave procedure are also disclosed. In one embodiment, a method performed by a RAN node for a MB session leave procedure comprises receiving a MB session release message from an AMF, the MB session release message being for a particular UE for a particular MB session. The method further comprises determining that the particular UE is a last UE for the MB session at the RAN node and, responsive thereto, sending a leave message to a Multicast Broadcast User Plane Function (MB-UPF) to stop an associated media stream to the RAN node and stopping any ongoing PTP or PTM transmission for the MB session at the RAN node.

Corresponding embodiments of a RAN node for a MB session leave procedure are also disclosed. In one embodiment, a RAN node for a MB session leave procedure is adapted to receive a MB session release message from an AMF, the MB session release message being for a particular UE for a particular MB session. The RAN node is further adapted to determine that the particular UE is a last UE for the MB session at the RAN node and, responsive thereto, send a leave message to a MB-UPF to stop an associated media stream to the RAN node and stopping any ongoing PTP or PTM transmission for the MB session at the RAN node.

In one embodiment, a RAN node for a MB session leave procedure comprises processing circuitry configured to cause the RAN node to receive a MB session release message from an AMF, the MB session release message being for a particular UE for a particular MB session. The processing circuitry is further configured to cause the RAN node to determine that the particular UE is a last UE for the MB session at the RAN node and, responsive thereto, send a leave message to a MB-UPF to stop an associated media stream to the RAN node and stopping any ongoing PTP or PTM transmission for the MB session at the RAN node.

Embodiments of a method performed by a MB-SMF for a MB session delete procedure are also disclosed. In one embodiment, a method performed by a MB-SMF for a MB session delete procedure comprises receiving a request to deallocate a particular MB session, sending a request to a MB-UPF to release resources associated to the particular MB session, and sending a MB session delete message to an AMF associated to the particular MB session, the MB session delete message being a message that requests the AMF to delete the particular MB session.

Corresponding embodiments of a MB-SMF for a MB session delete procedure are also disclosed. In one embodiment, a MB-SMF for a MB session delete procedure is adapted to receive a request to deallocate a particular MB session, send a request to a MB-UPF to release resources associated to the particular MB session, and send a MB session delete message to an AMF associated to the particular MB session, the MB session delete message being a message that requests the AMF to delete the particular MB session.

In one embodiment, a network node for implementing a MB-SMF for a MB session delete procedure comprises processing circuitry configured to cause the network node to receive a request to deallocate a particular MB session, send a request to a MB-UPF to release resources associated to the particular MB session, and send a MB session delete message to an AMF associated to the particular MB session, the MB session delete message being a message that requests the AMF to delete the particular MB session.

Embodiments of a method performed by an AMF for a MB session delete procedure are also disclosed. In one embodiment, a method performed by an AMF for a MB session delete procedure comprises receiving a MB session delete message from a MB-SMF, the MB session delete message being a message that requests the AMF to delete the particular MB session. The method further comprises sending one or more messages to delete the particular MB session, the one or more messages comprising: (a) a message to one or more RAN nodes to request deletion of resources allocated for the particular MB session, (b) a message to one or more UEs that joined the particular MB session to release resources allocated for the particular MB session and/or to leave the particular MB session, or (c) both (a) and (b).

Corresponding embodiments of an AMF for a MB session delete procedure are also disclosed. In one embodiment, an AMF for a MB session delete procedure is adapted to receive a MB session delete message from a MB-SMF, the MB session delete message being a message that requests the AMF to delete the particular MB session. The AMF is further adapted to send one or more messages to delete the particular MB session, the one or more messages comprising: (a) a message to one or more RAN nodes to request deletion of resources allocated for the particular MB session, (b) a message to one or more UEs that joined the particular MB session to release resources allocated for the particular MB session and/or to leave the particular MB session, or (c) both (a) and (b).

In one embodiment, a network node for implementing an AMF for a MB session delete procedure comprises processing circuitry configured to cause the network node to receive a MB session delete message from a MB-SMF, the MB session delete message being a message that requests the AMF to delete the particular MB session. The processing circuitry is further configured to cause the network node to send one or more messages to delete the particular MB session, the one or more messages comprising: (a) a message to one or more RAN nodes to request deletion of resources allocated for the particular MB session, (b) a message to one or more UEs that joined the particular MB session to release resources allocated for the particular MB session and/or to leave the particular MB session, or (c) both (a) and (b).

Embodiments of a method performed by a RAN node for a MB session delete procedure are also disclosed. In one embodiment, a method performed by a RAN node for a MB session delete procedure comprises receiving, from an AMF, a request to release resources associated with a particular MB session and releasing resources utilized at the RAN node for the particular MB session.

Corresponding embodiments of a RAN node for a MB session delete procedure are also disclosed. In one embodiment, a RAN node for a MB session delete procedure is adapted to receive, from an AMF, a request to release resources associated with a particular MB session and release resources utilized at the RAN node for the particular MB session.

In one embodiment, a RAN node for a MB session delete procedure comprises processing circuitry configured to cause the RAN node to receive, from an AMF, a request to release resources associated with a particular MB session and release resources utilized at the RAN node for the particular MB session.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
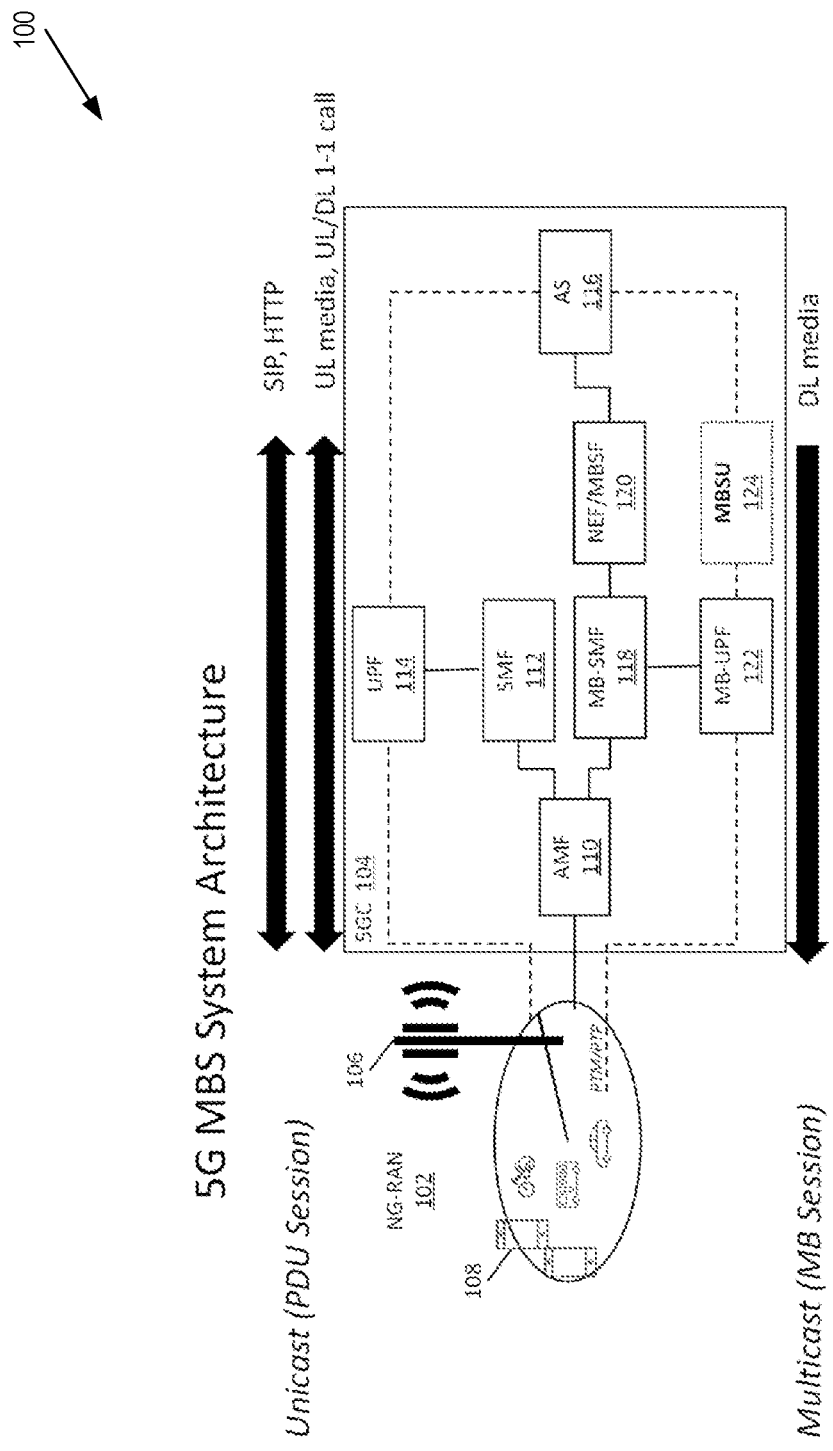
FIG. 1 illustrates a Fifth Generation (5G) Multicast Broadcast Services (MBS) system in which embodiments of the present disclosure may be implemented.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

MBS: Multicast Broadcast Services. When used as a prefix, the MBS is sometimes used equivalent with MB.

MB: Multicast Broadcast.

Unicast: Communication over a point-to-point communication channel

Multicast: Communication to a group of receivers who has announced their interest in the communication. Thereby the sender knows where the receivers are located.

Broadcast: Communication to a group of receivers. The sender does typically don't know where the receivers are located or how many they are. Therefore, transmission is typically done towards pre-configured areas.

UL: Uplink, i.e., in the direction from UE towards the network and towards the communication peer outside the 3GPP network, e.g. on Internet.

DL: Downlink, i.e., in the direction towards the UE from the network or from the communication peer outside the 3GPP network, e.g. on Internet.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As discussed above, multicast/broadcast services are not currently supported on 5G NR. With the enhanced characteristics of the 5G NR, e.g. short delays, bandwidth, etc., it is believed Mission Critical Services (e.g., Mission Critical Push To Talk (MCPTT), Mission Critical Data (MCData), and Mission Critical Video (MCVideo)), as well as Vehicle to Everything (V2X) services, will show an enhanced and much better performance on 5G NR.

For 5G Multicast Broadcast Services (MBS) Multicast support, the 5G System (5GS) must support UEs joining multicast groups. "Joining" is sometimes referred to as "Multicast Service Activation". It must also be possible to start 5G MBS Sessions (aka MBS Bearers), i.e. start transmission of data or media to the group of User Equipments (UEs). For these aspects of the Multicast/Broadcast Multimedia Subsystem (MBMS) for the Evolved Packet System (EPS), the interested reader is directed to 3GPP TS 23.246 V16.1.0 clause 8.2 "MBMS Multicast Service Activation" and clause 8.3 "MBMS Session Start Procedure". Various tentative proposals on Join and Session Start for 5G MBS multicast support are outlined in 3GPP TR 23.757 V0.3.0, see, e.g., FIG. 6.2.2.1-1, FIG. 6.3.2-1, FIG. 6.4.2.2-1, FIG. 6.6.2.1-1, etc.

Certain aspects of the present disclosure and their embodiments may provide solutions to the aforementioned or other challenges. Embodiments of a solution for the detailed interaction between the 5G Radio Access Network (RAN) (also referred to as NR RAN or Next Generation RAN (NG-RAN)) and the 5G Core (5GC) for a 5G MBS Session Join procedure and a 5G MBS Session Start procedure are disclosed herein. In some places alternative message names are given.

Embodiments of a solution for the detailed interaction between the NG-RAN and the 5GC for 5G MBS Session Leave, Session Stop, and Session Delete procedures are also disclosed herein. In some places alternative message names are given.

Embodiments of solutions are disclosed herein that provide detailed sequences on how NG-RAN and 5GC would interact for the 5G MBS with key parameters included, Contexts stored in the NG-RAN, AMF, and Multicast/Broadcast SMF (MB-SMF), etc.

Embodiments of a solution are also disclosed herein where MBS Sessions can be handled in the 5GS independently of the Protocol Data Unit (PDU) Sessions which UEs uses for application layer signaling (Group Creation, Session Announcements, etc.).

FIG. 1 illustrates a 5G MBS system 100 in which embodiments of the present disclosure may be implemented. As illustrated, the 5G MBS system 100 includes a NG-RAN 102 and a 5GC 104 (i.e., a NR RAN or 5G RAN). The NG-RAN 102 includes a base station 106 (which is also referred to herein as a NG-RAN node 106), which in 5G NR is referred to as a gNB, that serves (i.e., provides 5G access to) a number of wireless communication devices 108. The wireless communication devices 108 are, in the example embodiments described herein, oftentimes UEs and, as such, sometimes referred to as UEs 108. The 5GC 104 includes, for a unicast Protocol Data Unit (PDU) session(s), an AMF 110, an SMF 112, a UPF 114, and an Application Server (AS) 116. Further, for a multicast session (i.e., a MBS session which is also referred to herein as a MB session), the 5GC 104 includes the AMF 110, a MB-SMF 118, a Network Exposure Function (NEF)/MBS Function (MBSF) 120, a Multicast Broadcast UPF (MB-UPF) 122, a MBS User plane (MBSU) 124, and the AS 116.

Figure 2:
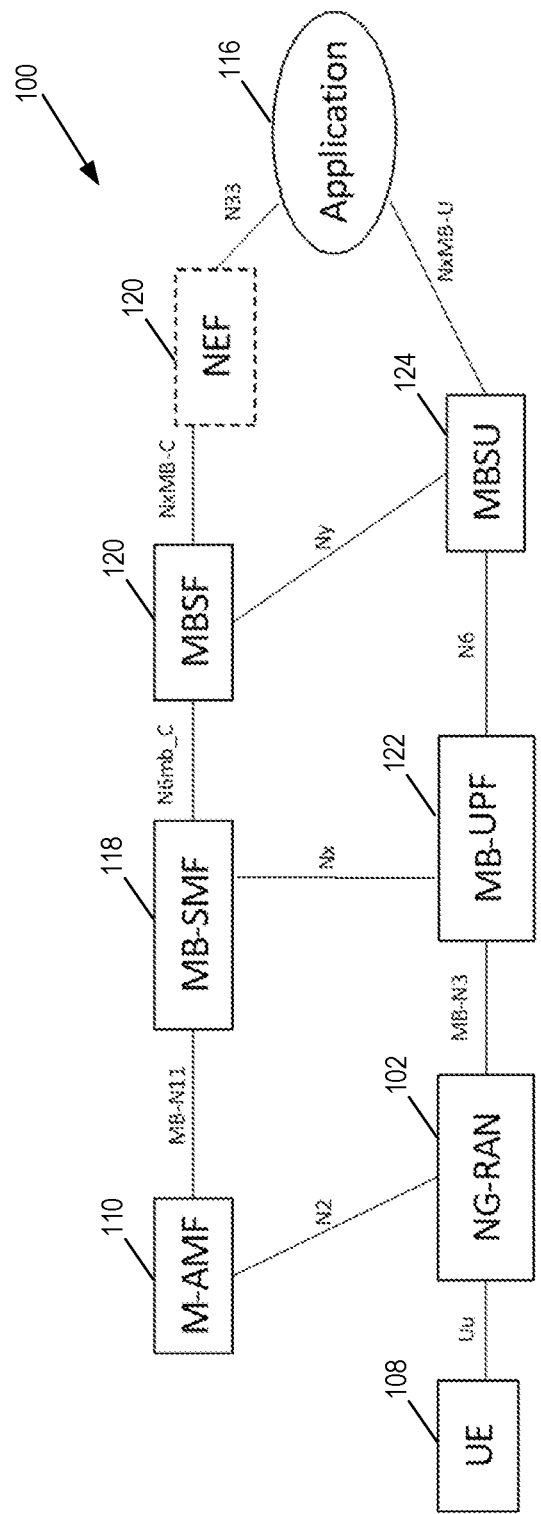
FIG. 2 is another representation of the 5G MBS system of FIG. 1, which corresponds to architecture option #2 in Third Generation Partnership Project (3GPP) Technical Report (TR) 23.757 V0.3.0.

FIG. 2 is another representation of the 5G MBS system 100, which corresponds to architecture option #2 in 3GPP TR 23.757 V0.3.0.

Figure 3:
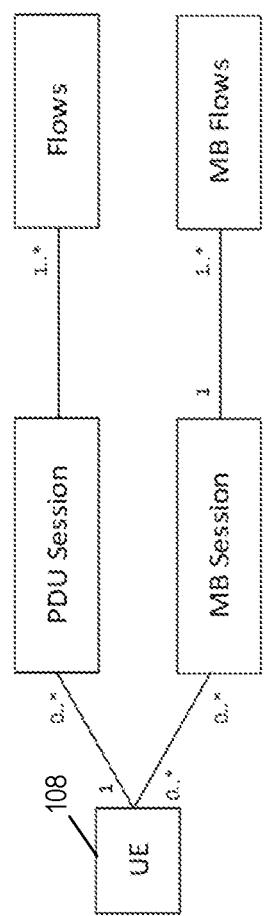
FIG. 3 illustrates the 5G MBS data model for architecture option #2 in 3GPP TR 23.757 V0.3.0.

FIG. 3 illustrates the 5G MBS data model for architecture option #2 in 3GPP TR 23.757 V0.3.0. As illustrated, a UE 108 is associated to one or more PDU sessions each having one or more flows. The UE 108 is also associated to one or more MB sessions each having one or more MB flows.

Figure 4:
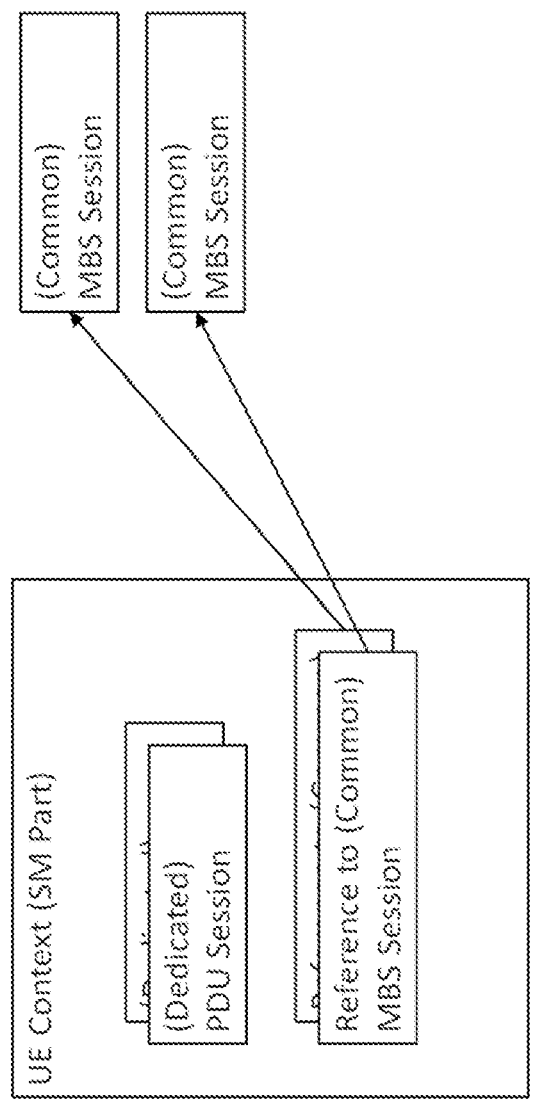
FIG. 4 illustrates a resume model used for architecture option #2 in 3GPP TR 23.757 V0.3.0.

FIG. 4 illustrates a resume model used for architecture option #2 in 3GPP TR 23.757 V0.3.0. As illustrated, the UE Context resides in the UE 108, NG-RAN 102, AMF 110/SMF 112/UPF 114. The MBMS Session Context resides in the NG-RAN 102, MB-AMF, MB-SMF 118, and MB-UPF 122. Note that MB-SMF 118/SMF 112 and MB-UPF 122/UPF 114 may be but are not necessarily the same entity (i.e., the SMF 112 and MB-SMF 118 may or may not be the same entity and, likewise, the UPF 114 and UPF 122 may or may not be the same entity). MB-AMF functions are available in each AMF 110 where "member" UEs reside.

Figure 5:
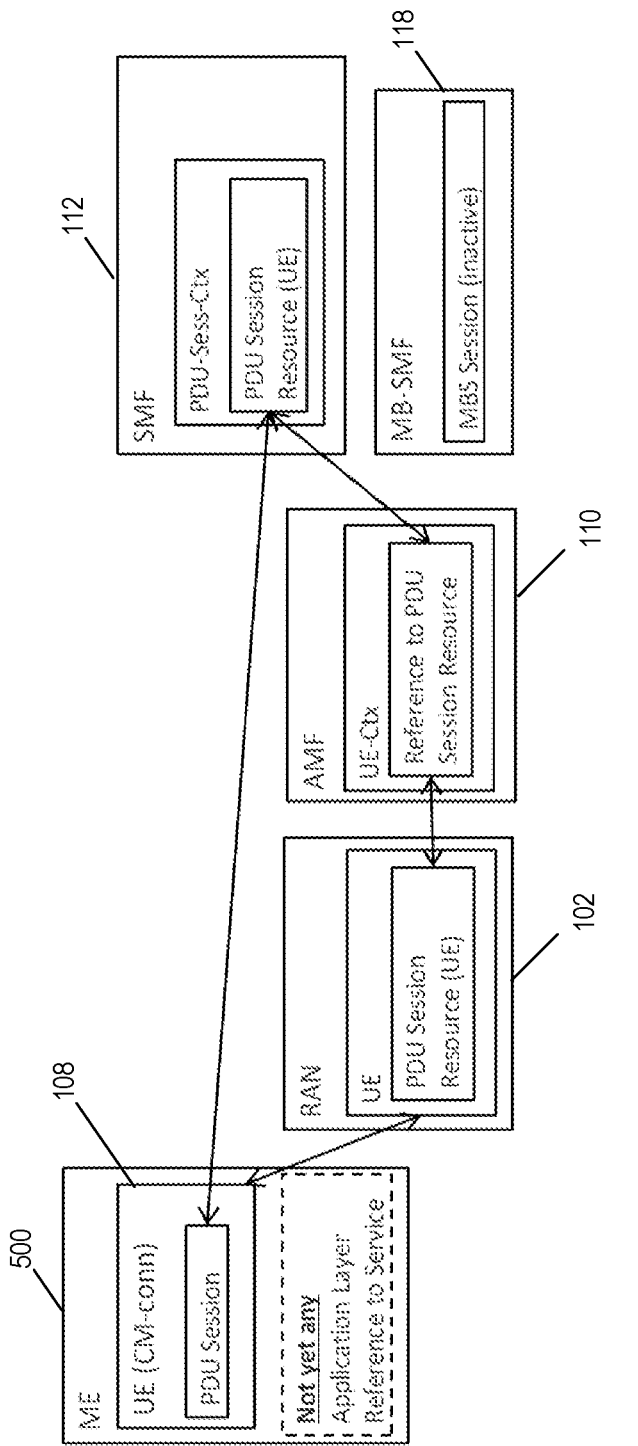
FIG. 5 illustrates creation of a Multicast Broadcast Multimedia Services (MBMS) Session Context.

The MBMS Session Context includes some or all of the following information:
At the NG-RAN node (e.g., at the base station 106):
Session inactive: empty (NG-RAN node could collect a list of CM-Connected UEs)
Session active: per AMF: MBS SessionResource context data, linked UEs, per cell/DU resource context
At the AMF 110:
Session inactive: linked MB-SMF 118, linked UE-contexts
Session active: MBS SessionResource context per involved NG-RAN node
At the MB-SMF 118:
Linked AMFs (those where "member" UEs reside)
At the MB-UPF 122:
Session inactive: linked SMFs
Session active: NG-RAN nodes (CU-UPs) joining the Internet Protocol (IP) Multicast (MC) address FIG. 5 illustrates creation of a MBMS Session Context. Once an MBS Session context is created in the MB-SMF 118/MB-UPF 122/MBSF 120 (Temporary Mobile Group Identity (TMGI) allocated by the AS 116), application layer group affiliation is possible by user. FIG. 5 shows a CM-connected UE 108 (which in this example is part of a mobile equipment (ME) 500) with, e.g., default bearer resources in the NG-RAN 102.

Figure 6:
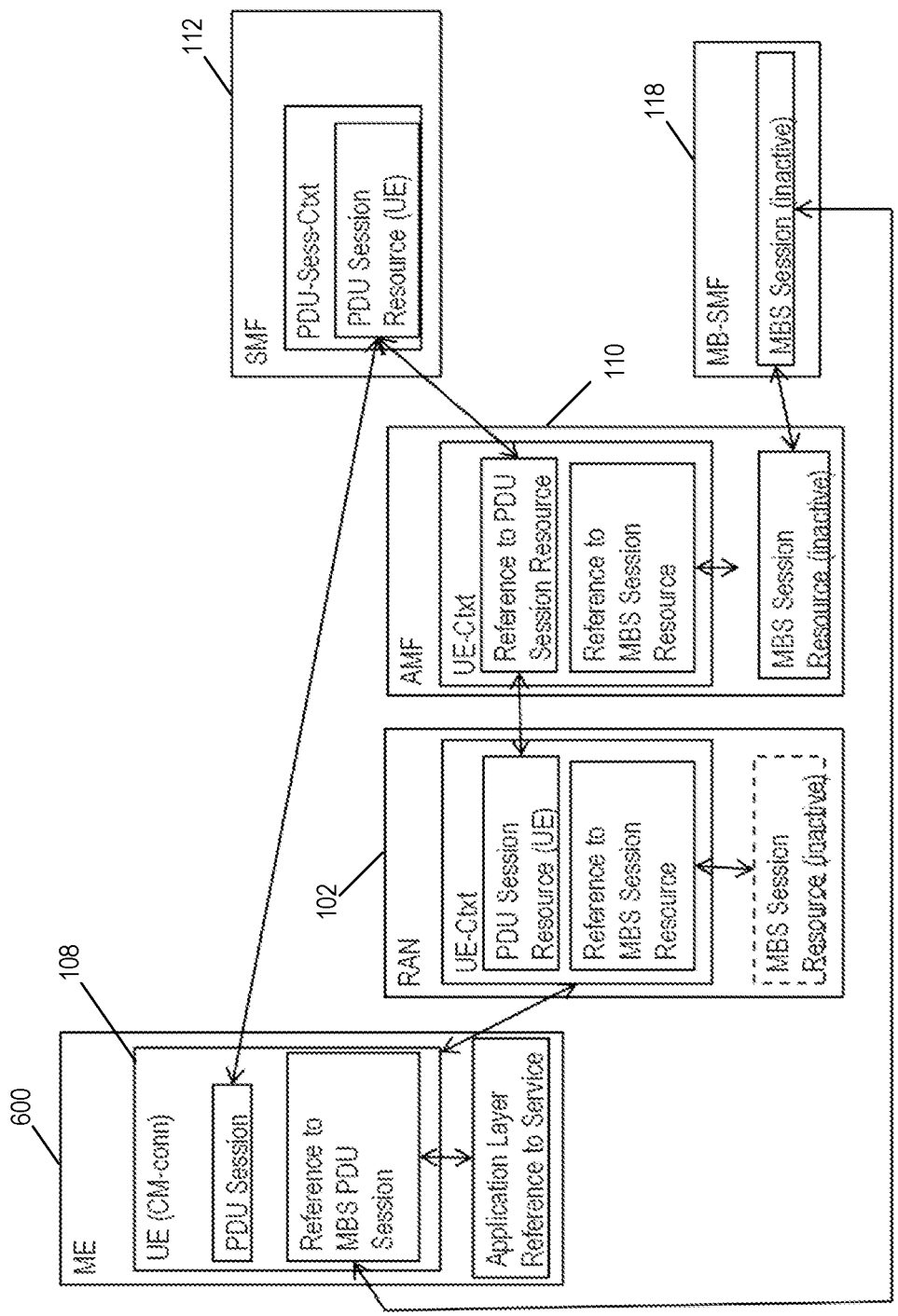
FIG. 6 illustrates a User Equipment (UE) (which in this example is part of a mobile equipment (ME)) joining (inactive) an MBMS Session.

FIG. 6 illustrates a UE 108 (which in this example is part of a mobile equipment (ME) 600) joining (inactive) an MBMS Session. Application-level group affiliation is provided. The UE 108 triggers a Non-Access Stratum (NAS) level joining to the MBS Session. UE Contexts in the NG-RAN 102 and the AMF 110 contain a reference to the MBS Session context in the MB-SMF 118.

Figure 7:
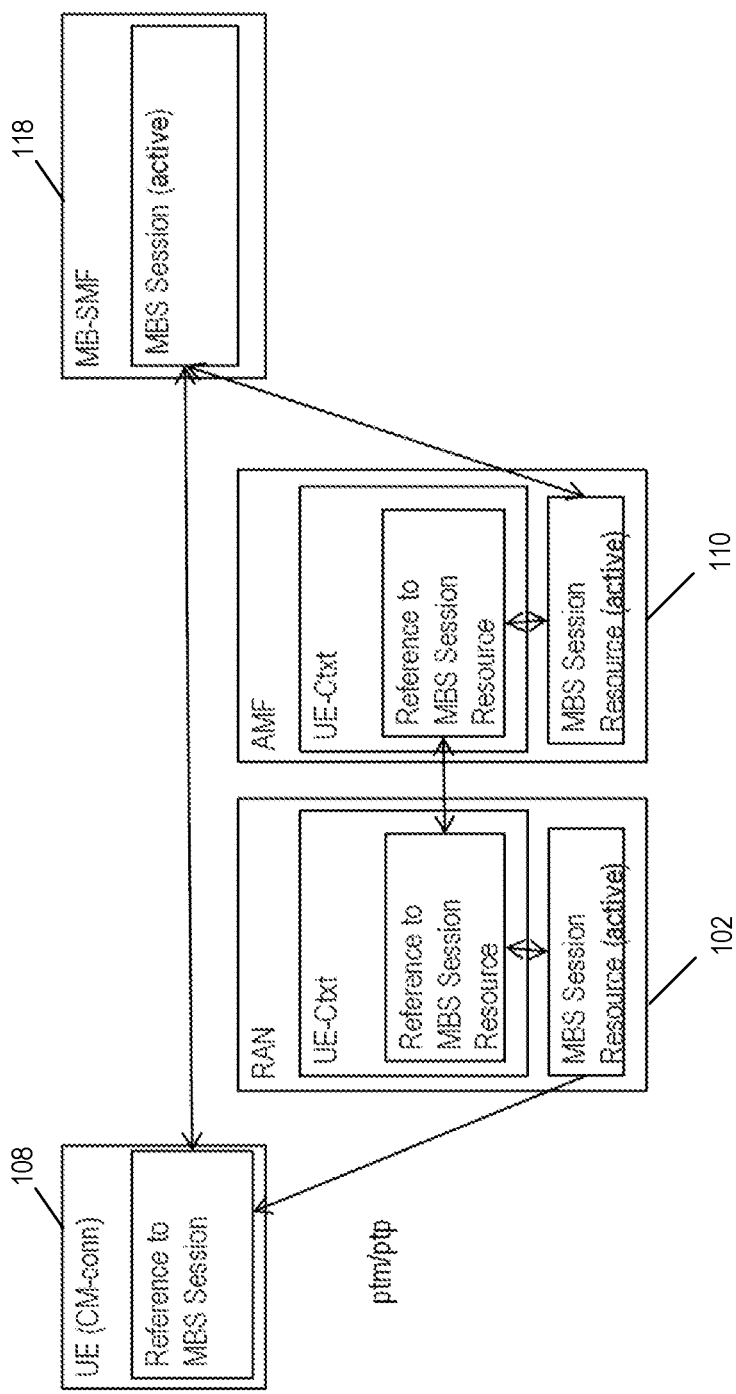
FIG. 7 illustrates an active MBMS Session.

FIG. 7 illustrates an active MBMS Session. After session start with potential group paging and "interested" UEs joining the active session, the AMF 110 establishes an MBS Session Resource (similar to dedicated procedure in NGAP), and the NG-RAN 102 makes a decision per cell on Point to Point (PTP)/Point to Multipoint (PTM).

A description of some example embodiments of procedures for Group Join, MBMS Session Start, MBMS Session Leave, MBMS Session Stop, and MBMS Session Delete will now be provided.

Group Join and MBMS Session Start

This embodiment assumes the architectural option 2 as described above. In particular, this embodiment assumes:
The AMF 110 that serves UEs 108 for non-MBS services is capable of processing MBS specific UE context data and discovering the MB-SMF 118 with the MBS Session Context.
The NG-RAN node 106 is capable of processing MBS specific UE context data, which is necessary, e.g. at group paging to deliver the group page to all UEs 108 served by the NG-RAN node 106 (e.g., UEs in RRC_I-NACTIVE), to make a decision whether to provide MBS data in PTP or PTM fashion, and to enable minimization of data loss during UE mobility.

This embodiment further assumes that joining the MBS Group and MB Session Start may be spread over time. This is reflected in the approach to keep MBS Service Context data in the NG-RAN node 106 and the AMF 110 even if no MB Session is active, in order to aid the AMF 110 and the NG-RAN node 106 to request and establish MBS user plane resources according to the group members' current location.

Figure 8:
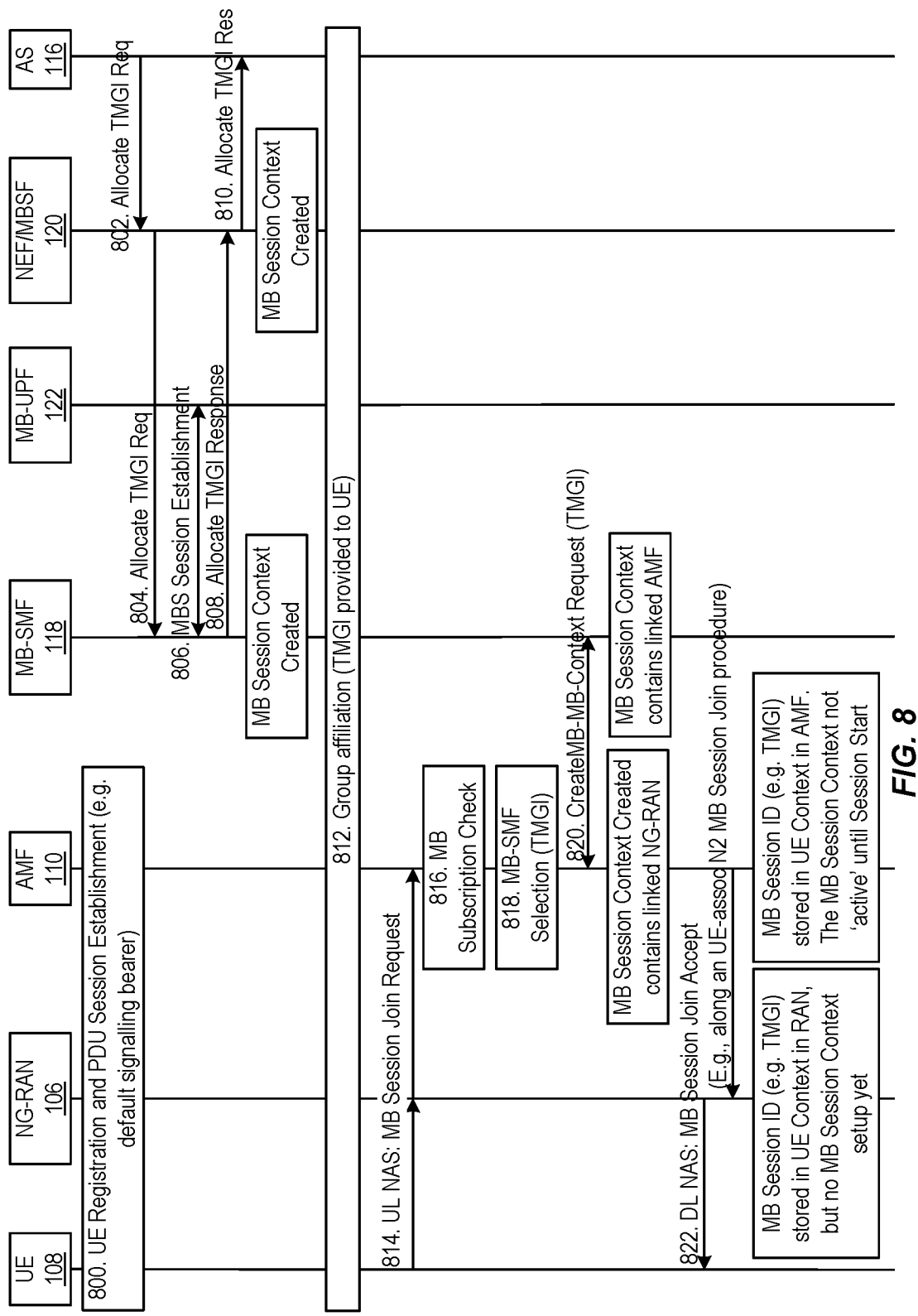
FIG. 8 illustrates a Group Join (i.e., MBMS session join) procedure in accordance with one embodiment of the present disclosure.

FIG. 8 illustrates a Group Join (i.e., MBMS session join) procedure in accordance with one embodiment of the present disclosure. The steps of the procedure are as follows:
Step 800: The UE 108 is registered and user plane resources are allocated.
Steps 802-810: Establishment of MBS Session Context in the MB-SMF 118, MB-UPF 122, and the NEF/MBSF 120.
Step 812: UE(s) and the AS 116 communicate to form an MBS Group.
Step 814: The UE 108 indicates its interest to Join an MBS Session by an UL NAS Message MB Session Join (MB Session ID, e.g. TMGI) or, alternatively, an UL NAS MB Service Request (MB Session ID, e.g. TMGI). The NG-RAN node 106 forwards the NAS message to the AMF 110.
NAS and AS MBS user plane resource model (MBS Session, MBS Session Resource, etc.) in analogy to the UE associated user plane resource model. Hence, the UE 108 requests the setup of an MBS Session associated with the TMGI, but this does not involve the setup of individual user plane resources per UE, but only generates an entry in the respective UE Contexts in the 5GC 104 and the NG-RAN node 106.
Step 816: The AMF 110 performs a subscription check with a Unified Data Management (UDM), unless subscription data is already available at the AMF 110. Optionally, while not shown here, the AMF 110 may perform an authorization check at the AS 116 by providing its UE ID and the MBS Session ID (e.g., TMGI) to the MB-SMF 118 which forwards this information to the AS 116 via NEF/MBSF 120 to check if the UE 108 is authorized to join this group (MB Session). This authentication check may also happen in the MB-SMF 118 if allowed UE IDs for the group were downloaded to the MB-SMF 118 as part of step 802 and 804.

Step 818: The AMF 110 selects the MB-SMF 118 via the TMGI.

Step 820: The MBS Session Context in the AMF 118 is created. The AMF reference is added to the MBS Session Context in the MB-SMF 118. The AMF 110 allocates an identity that is used to page the UE 108 when the UE 108 is in CM-Idle when the specific service starts. This identity can be the TMGI or a Group Page Identity associated with the TMGI.

Optionally, if Session Management Subscription data is not available, then the MB-SMF 118 retrieves the Session Management Subscription data from the UDM and validates the request. Alternatively, validation can be performed in step 816. The MB-SMF 118 checks the validity of the UE request. More specifically, the MB-SMF 118 checks:
 Whether the UE request is compliant with the user subscription and with local policies;
 Whether the UE 108 is eligible to join the service associated with the specific TMGI;
 whether the UE 108 is located within the eligible service area based on the UE location indication from the AMF 110.

If the UE request is considered as not valid, the MB-SMF 118 decides to not accept to establish the PDU Session.

Step 822: The AMF 110 completes the MBS PDU Session Establishment procedure towards the UE 108.

In the course of the NAS interaction for the MBS PDU Session, the NG-RAN node 106 is at least provided with the MBS PDU Session reference (TMGI). The TMGI is inserted into the NG-RAN UE Context. This may be done, for example, along a new N2 MBS PDU Session Resource Setup procedure. In one embodiment, the NAS procedure uses an accept message. Note that, in the illustrated embodiment, no MBS Session Context is established in the NG-RAN node 106 at this point—this is done at session start.

Figure 9:
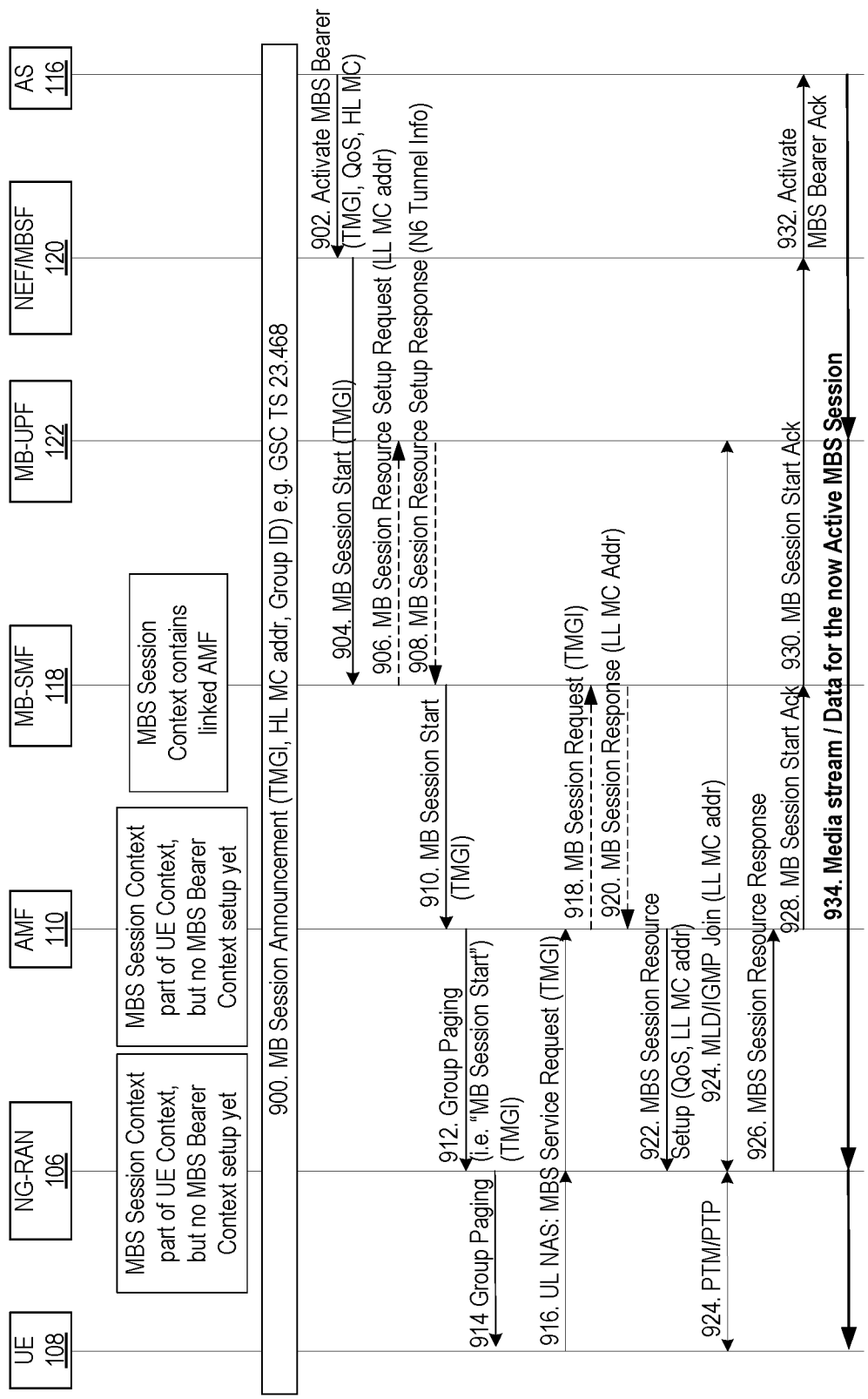
FIG. 9 illustrates a Session Start procedure in accordance with one embodiment of the present disclosure.

FIG. 9 illustrates a Session Start procedure in accordance with one embodiment of the present disclosure. The steps of the procedure of FIG. 9 are as follows:

Step 900: Session Announcement via application layer signaling.

Steps 902-910: The AMF 110 receives the MB Session Start information. In the course of receiving this Session Start information, MBS user plane resources are activated in the MB-SMF 118 and MB-UPF 122.

Step 912: The AMF 110 performs group paging and includes the Group Paging Identity in the Paging message in the registration area (for CM-Idle UEs) of the UEs' that have association to that MB Session (e.g., TMGI), if any. If no such UEs, steps 912 to 920 are skipped.

Step 914: The NG-RAN node 106 in the NG-RAN 102 triggers group paging. In one embodiment, UEs listen to the same paging channel. Further, any appropriate identity may be used for group paging. Note that, in this regard, the group paging identity may be coordinated among NG-RAN nodes.

Step 916: A UE 108 interested in the MB Session sends an MBS Service Request to the AMF 110. Optionally, this may include MBS Session Join. The MBS Service Request includes the TMGI or other reference to the MB Session that triggered paging. In one embodiment, if the UE 108 interested in the MB Session is in CM-Connected with RRC_INACTIVE, the UE 108 performs a Resume procedure potentially indicating the TMGI or other reference to the MB Session that triggered paging. It is assumed that for both cases, i.e. UE in CM-Idle a well as UE in CM-Connected with RRC_INACTIVE, the UE 108 is aware of the Group Paging Identity as that UE 108 previously communicated to the network its interest of the MB Session. Consequently, the UE's Contexts in the 5GC 104 and (if in CM-Connected) in the NG-RAN 102 have an entry indicating the MB Session (e.g., TMGI).

Steps 918-920: Upon the first UE interested in the MB Session, the AMF 110 requests the setup of the MB Session from the MB-SMF 118. For NG-RAN nodes with at least one UE in CM-Connected that have association to that MB Session, this step can be conducted in parallel with step 912.

Step 922: The NG-RAN node 108 is requested to establish MBS PDU Session Resources. For NG-RAN nodes with at least one UE in CM-Connected that have association to that MB Session, this step can be conducted in parallel with step 912.

Step 924: The NG-RAN node 106 decides to establish either PTP or PTM DL resources for the MBS PDU Session and joins the multicast group.

Step 926: The NG-RAN node 106 reports successful establishment of MBS PDU Session resources.

Steps 928-932: The MB Session Start is acknowledged.

Step 934: MB Session is active.

In some embodiments, cardinality of network nodes involved in MBS Group- and Session Management is as follows. MBS Group- and Session Management may involve more than one network entity of the same kind. The following principles are established:
 5GC User Plane resources for an MB Session within one AMF Region involve one dedicated (MB) SMF and one (MB) UPF.
 A group may consist of UEs, each of them served by different AMFs and NG-RAN nodes. Consequently, an MBS Context is created by each AMF serving one of those UEs; and a reference to this MBS Context is contained in each UE Context in the AMF and the NG-RAN node.
 An NG-RAN node joins an IP MC address for an MB Session only once, though several AMFs may control the establishment of NG-RAN resources for that MB Session in that NG-RAN node, if UE contexts joining the active MB Session after session start reside in more than one AMF.

Session Leave

The following embodiments assume the architectural option 2.

Also note that the following embodiments assume that the NG-RAN 102 can be notified by the UE 108 of its interested MBS service.

Figure 10:
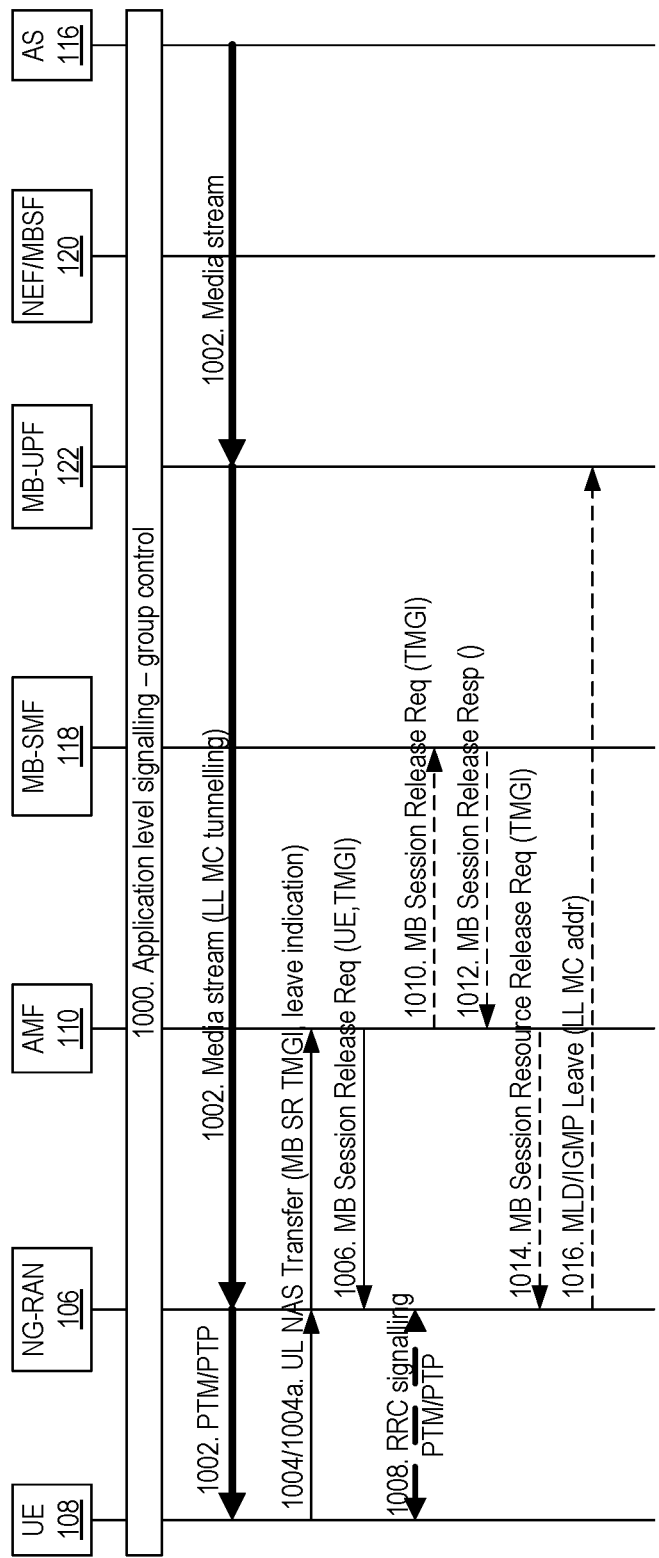
FIG. 10 illustrates a Session Leave procedure in accordance with one embodiment of the present disclosure.

FIG. 10 illustrates a Session Leave procedure in accordance with one embodiment of the present disclosure. The steps of the procedure of FIG. 10 are as follows:

Step 1000: Decision on application level for a UE 108 to leave the MB Session (i.e., leave the MB Group).

Step 1002: There may be a media stream before the UE 108 has left. The UE 108 receives the media by PTM or PTP.

Step 1004: The UE 108 sends a UL NAS message MB Service Request (TMGI, leave indication) or UL NAS message MB Session Leave to the AMF 110. The AMF 110 removes the TMGI from the UE Context.

Step 1006: The AMF 110 informs the NG-RAN node 106 that the UE 108 has left the MB Session.

Step 1008: The NG-RAN node 106 adjusts the PTM/PTP transmission if necessary.

Step 1008a: If this UE 108 is the last UE in this NG-RAN node 106, the NG-RAN node 106 sends a Leave message (LL MC addr) to stop the Media stream to NG-RAN node 106 and stops any ongoing PTM/PTP transmission. The NG-RAN node 106 notifies the AMF(s) 110 that it has left the MB Session.

Steps 1010-1012: If this UE 108 is the last UE in this AMF 110 being part of the MB Session or alternatively step 1008a was executed and this was the last NG-RAN node 106 that is part of the MB Session, the AMF 110 sends an MB Session Release Request (TMGI) to the MB-SMF 118, for AMF 110 to unsubscribe to the MB Session. The MB-SMF 118 responds to the message.

Step 1014: Alternatively to step 1008a, if this UE 108 is the last UE in this AMF 110 being part of the MB Session, the AMF 110 sends an MB Session Release Request (TMGI) to the NG-RAN node 106.

Step 1016: Alternatively to step 1008a, the NG-RAN node 106 checks if the AMF 110 was the last AMF who used resources for the MB Session. If so, the NG-RAN node 106 sends a Leave message (LL MC addr) to stop the Media stream to the NG-RAN node 106 and stops any ongoing PTM/PTP transmission.

Session Stop

The Session Stop is used to stop Media delivery for a MB Session, i.e. to all UEs in a group defined by a TMGI. Afterwards, the MB Session will still remain, and the Session can later be started again. However, resources in the NG-RAN 102 are released.

Figure 11:
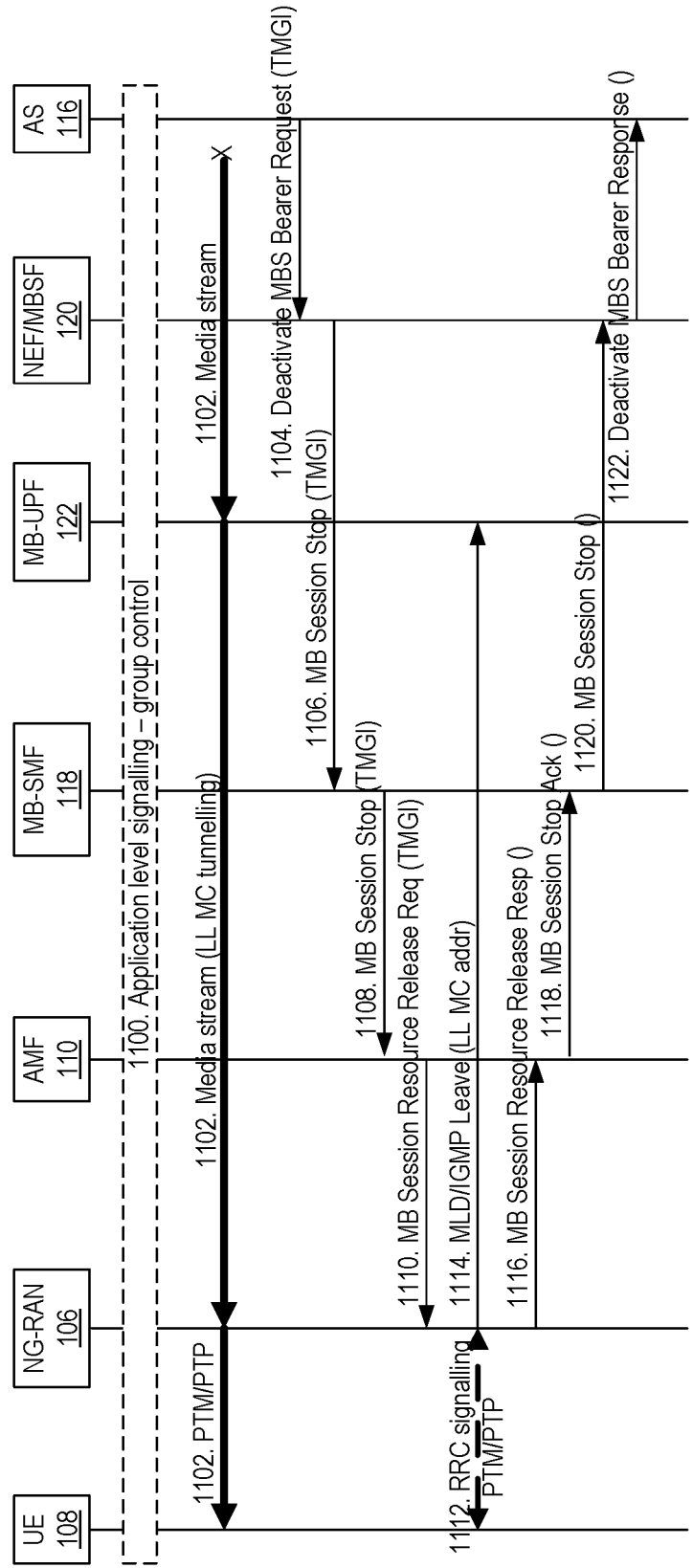
FIG. 11 illustrates a Session Stop procedure in accordance with one embodiment of the present disclosure.

FIG. 11 illustrates a Session Stop procedure in accordance with one embodiment of the present disclosure. The steps of the procedure of FIG. 11 are as follows:

Step 1100: Decision on application level for the Session to be stopped.

Step 1102: The AS 116 may stop the Media stream before sending the Deactivate MBS Bearer Request message to the 3GPP network.

Step 1104: The AS 116 sends a Deactivate MBS Bearer Request (TMGI) message to the NEF/MBSF 120.

Step 1106: The NEF/MBSF 120 sends a MB Session Stop (TMGI) to the MB-SMF(s) 118 that has been involved in the MB Session.

Step 1108: The MB-SMF(s) 118 send MB session stop messages to the AMF(s) 110.

Step 1110: The AMF(s) 110 sends a MB session resource release request to the NG-RAN node(s) 106.

Step 1112: The NG-RAN node(s) 106 perform signaling to stop any ongoing PTP or PTM transmission(s) for the MB session.

Step 1114: The NG-RAN node(s) 106 sends a leave request to the MB-UPF 122.

Step 1116: The NG-RAN node(s) 106 sends a MB Resource Release Response to the AMF 110.

Step 1118: The AMF 110 sends an MB Session Stop Ack to the MB-SMF 118.

Step 1120: The MB-SMF 118 sends the MB Session Stop Ack to the NEF/MBSF 120.

Step 1122: The NEF/MBSF 120 sends a Deactivate Bearer Response to the AS 116.

Session Delete

The Session Delete is used to stop Media delivery for a MB Session, i.e. to all UEs in a group defined by a TMGI. Afterwards the MB Session will still remain, and the Session can later be started again. However, resources in the NG-RAN 102 are released.

Figure 12:
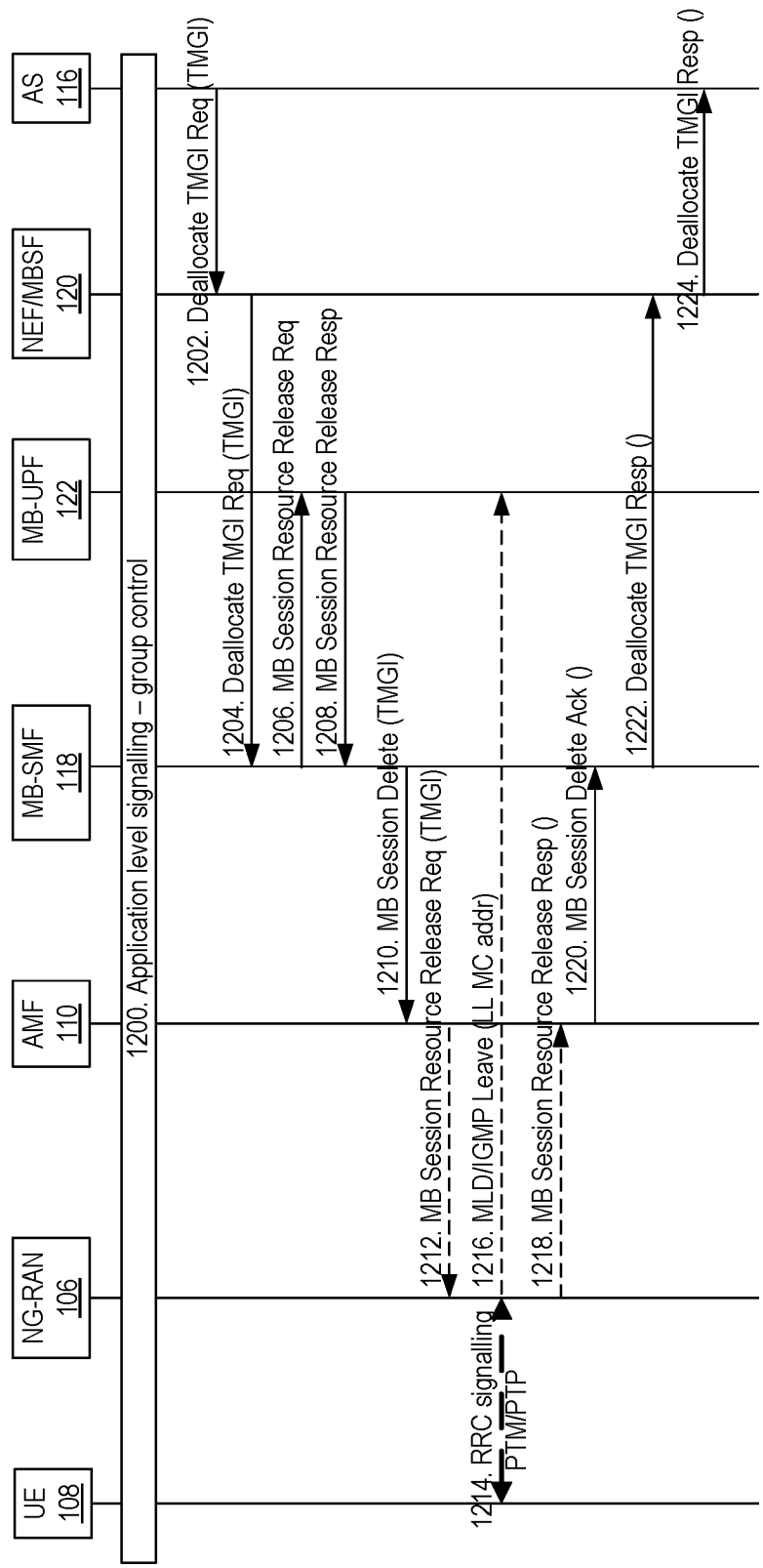
FIG. 12 illustrates a Session Delete procedure in accordance with one embodiment of the present disclosure.

FIG. 12 illustrates a Session Delete procedure in accordance with one embodiment of the present disclosure. The steps of the procedure of FIG. 12 are as follows:

Step 1200: Decision on application level to dissolve a group, delete MB Session Contexts, and deallocate the group TMGI.

Steps 1202-1204: The AS 116 requests deallocation of the TMGI.

Steps 1206-1208: The MB-SMF 118 request the MB-UPF 122 to release the resources allocated for the MB Session (e.g., designated by the TMGI).

Step 1210: The MB-SMF 118 requests the AMF 110 subscribed/associated with that MB Session to delete/release the MB Session. The AMF 110 removes its association with the MB Session (e.g., designate by the TMGI) and removes the association with the MB Session (designated by, e.g., TMGI) from the AMF UE Contexts.

Step 1212: The AMF 110 requests the NG-RAN node(s) 106 that have resources allocate for the MB Session and/or UEs 108 that joined the MB Session to release the resources and/or leave the MB Session, i.e. remove the association with the MB Session (designated by, e.g., TMGI) from the NG-RAN UE Contexts.

Step 1214: The NG-RAN node(s) 106 may reconfigure the radio interface.

Step 1216: The NG-RAN node(s) 106 send a Leave message to the MB-UPF 122.

Steps 1218-1222: The deletion is acknowledged. The involved network entities remove their association from the MB Session as well as remove that association from relevant UE Contexts.

NOTE: In one embodiment, similarly to synchronization of PDU Session, the synchronization of the MB Sessions between the UE 108 and the network is conducted at registration procedure. In one embodiment, this is done by the UE 108 including a new MB Session Status parameter in the Registration Request NAS message (step 1&3 of TR 23.501 Clause 4.2.2.2.2) if the UE 108 has any active or inactive/standby MB Sessions (e.g., TMGI(s)) in the UE 108. The AMF 110 checks if any of the MB Sessions/TMGIs in the MB Session Status have been deleted in the network and should be removed from the UE 108. The AMF 110 makes a new MB Session Status parameter and includes in the Registration Accept NAS message (step 21 of TS 23.501 clause 4.2.2.2.2) where the AMF 110 includes all valid MB Sessions/TMGIs out of the ones the UE 108 listed in the MB Session Status in step 1202 and 1206. The UE 108 removes locally any internal resources related to MB Sessions that are not marked as established in the received MB Session Status.

Additional Aspects

Figure 13:
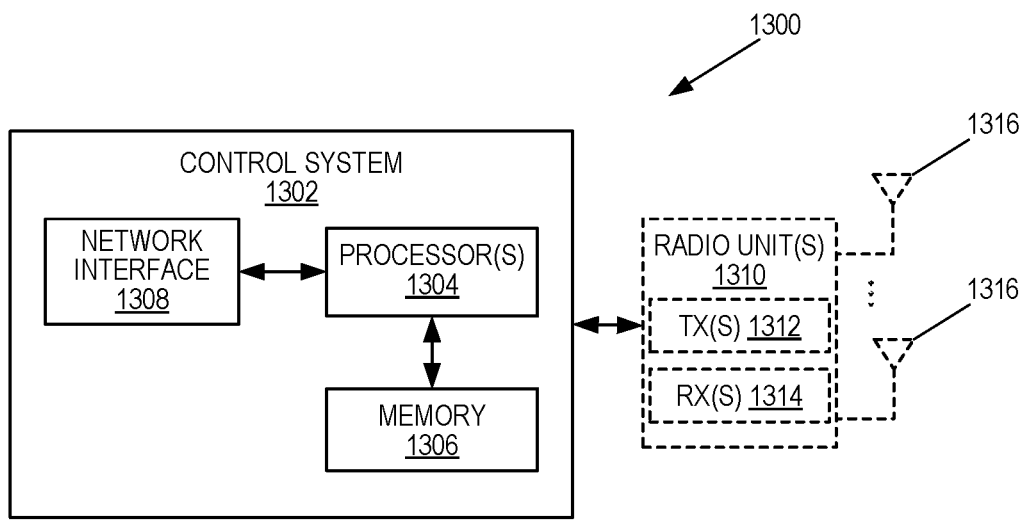
FIGS. 13, 14, and 15 are schematic block diagrams of a network node according to some embodiments of the present disclosure.

FIG. 13 is a schematic block diagram of a network node 1300 according to some embodiments of the present disclosure. Optional features are represented by dashed boxes. The network node 1300 may be, for example, a NG-RAN node or base station 106 or a network node that implements all or part of the functionality of a core network function (e.g., AMF 110, MB-SMF 118, NEF/MBSF 120, MB-UPF 122, AS 116, or the like) described herein. As illustrated, the network node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, if the network node 1300 is a NG-RAN node or base station 106, the network node 1300 may include one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of the network node 1300 as described herein (e.g., one or more functions of a NG-RAN node or base station 105 as described herein or one or more functions of core network function such as, the AMF 110, the MB-SMF 118, the NEF/MBSF 120, the MB-UPF 122, or AS 116, as described herein). In some embodiments, the function(s) are implemented in software that is stored, e.g., in the memory 1306 and executed by the one or more processors 1304.

Figure 14:
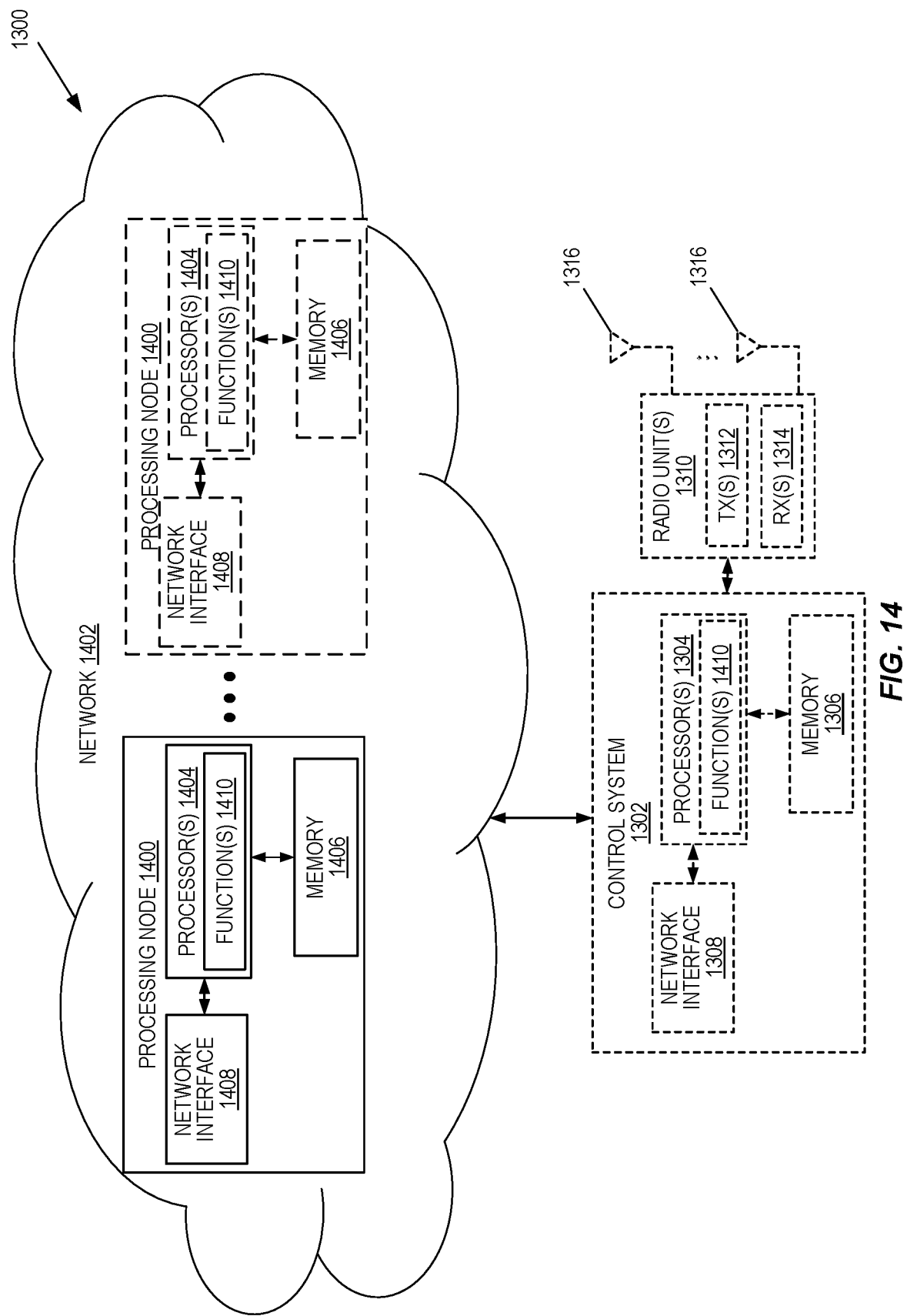

FIG. 14 is a schematic block diagram that illustrates a virtualized embodiment of the network node 1300 according to some embodiments of the present disclosure. As used herein, a "virtualized" network node is an implementation of the network node 1300 in which at least a portion of the functionality of the network node 1300 is implemented as a virtual component(s) (e.g., via a virtual machine(s) executing on a physical processing node(s) in a network(s)). As illustrated, in this example, the network node 1300 includes one or more processing nodes 1400 coupled to or included as part of a network(s) 1402. Each processing node 1400 includes one or more processors 1404 (e.g., CPUs, ASICs, FPGAs, and/or the like), memory 1406, and a network interface 1408. If the network node 1300 is a radio access node, the network node 1300 may also include the control system 1302 and/or the one or more radio units 1310, as described above. If present, the control system 1302 or the radio unit(s) are connected to the processing node(s) 1400 via the network 1402.

In this example, functions 1410 of the network node 1300 described herein (e.g., one or more functions of a NG-RAN node or base station 105 as described herein or one or more functions of core network function such as, the AMF 110, the MB-SMF 118, the NEF/MBSF 120, the MB-UPF 122, or AS 116, as described herein) are implemented at the one or more processing nodes 1400 or distributed across the one or more processing nodes 1400 and the control system 1302 and/or the radio unit(s) 1310 in any desired manner. In some particular embodiments, some or all of the functions 1410 of the network node 1300 described herein are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicate directly with the processing node(s) 1400 via an appropriate network interface(s).

In some embodiments, a computer program including instructions which, when executed by at least one processor, causes the at least one processor to carry out the functionality of the network node 1300 or a node (e.g., a processing node 1400) implementing one or more of the functions 1410 of the network node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
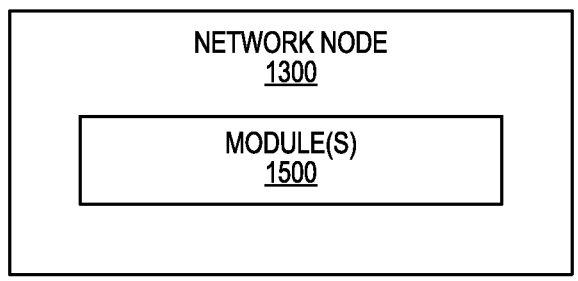

FIG. 15 is a schematic block diagram of the network node 1300 according to some other embodiments of the present disclosure. The network node 1300 includes one or more modules 1500, each of which is implemented in software. The module(s) 1500 provide the functionality of the network node 1300 described herein (e.g., one or more functions of a NG-RAN node or base station 105 as described herein or one or more functions of core network function such as, the AMF 110, the MB-SMF 118, the NEF/MBSF 120, the MB-UPF 122, or AS 116, as described herein). This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
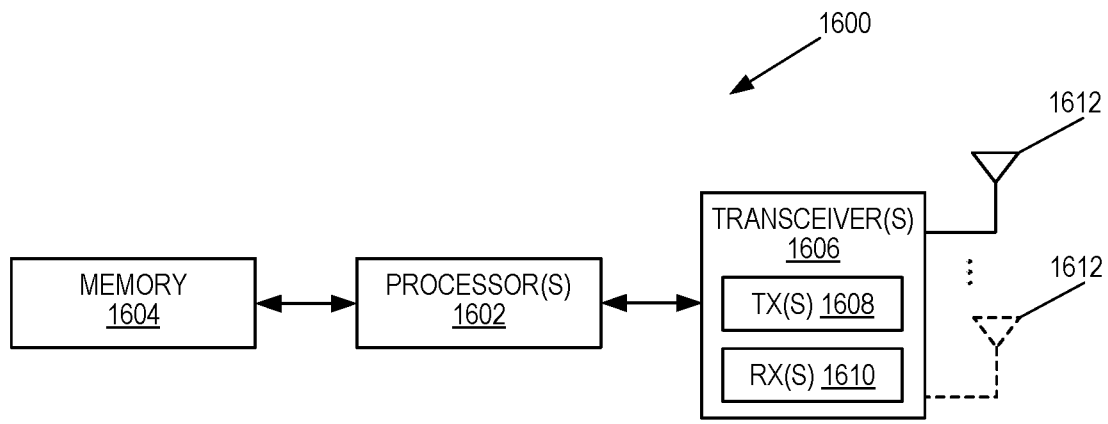
FIGS. 16 and 17 are schematic block diagrams of a wireless communication device or UE according to some embodiments of the present disclosure.

FIG. 16 is a schematic block diagram of a wireless communication device 1600 according to some embodiments of the present disclosure. The wireless communication device 1600 is one example embodiment of the wireless communication device or UE 108 described above. As illustrated, the wireless communication device 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. The transceiver(s) 1606 includes radio-front end circuitry connected to the antenna(s) 1612 that is configured to condition signals communicated between the antenna(s) 1612 and the processor(s) 1602, as will be appreciated by on of ordinary skill in the art. The processors 1602 are also referred to herein as processing circuitry. The transceivers 1606 are also referred to herein as radio circuitry. In some embodiments, the functionality of the wireless communication device 1600 described above (e.g., one or more functions of the wireless communication device or UE 108 described above) may be fully or partially implemented in software that is, e.g., stored in the memory 1604 and executed by the processor(s) 1602. Note that the wireless communication device 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the wireless communication device 1600 and/or allowing output of information from the wireless communication device 1600), a power supply (e.g., a battery and associated power circuitry), etc.

In some embodiments, a computer program including instructions which, when executed by at least one processor, causes the at least one processor to carry out the functionality of the wireless communication device 1600 according to any of the embodiments described herein (e.g., one or more functions of the wireless communication device or UE 108 described above) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
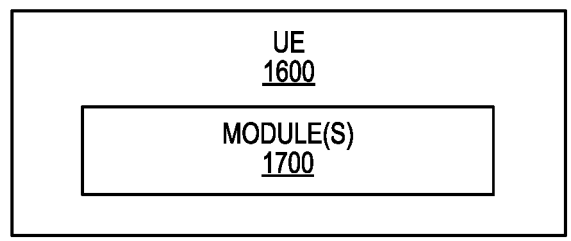

FIG. 17 is a schematic block diagram of the wireless communication device 1600 according to some other embodiments of the present disclosure. The wireless communication device 1600 includes one or more modules 1700, each of which is implemented in software. The module(s) 1700 provide the functionality of the wireless communication device 1600 described herein (e.g., one or more functions of the wireless communication device or UE 108 described above).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by an AMF (110) for a MB session join procedure, the method comprising one or more of the following:
  receiving (FIG. 8, step 7) a MB session join request from a User Equipment, UE, (108) via a RAN node (106), the MB session join request being a request to join a particular MB session;
  determining (FIG. 8, step 8) that the MB session join request is permitted by a subscription of the UE (108);
  selecting (FIG. 8, step 9) a MB-SMF based on information (e.g., TMGI) comprised in the MB session join request;
  communicating (FIG. 8, step 10) with the MB-SMF to create an MBS session context, the MBS Session Context comprising information that indicates the AMF (11);
  sending (FIG. 8, step 11) a MB session join accept message to the UE (108).

Embodiment 2: The method of embodiment 1 further comprising storing an identifier of the joined MB session to a UE context of the UE (108) stored at the AMF (110).

Embodiment 3: The method of embodiment 1 or 2 further comprising allocating an identity (e.g., TMGI or group page identity associated with the TMGI) used to page the UE (108).

Embodiment 4: The method of embodiment 3 further comprising storing the allocated identity in either the MB session context or the UE context.

Embodiment 5: The method of any one of embodiments 1 to 4 further comprising determining whether the UE (108) is authorized to join the MB session.

Embodiment 6: A network node (1300) that implements an AMF (110) adapted to perform the method of any one of embodiments 1 to 5.

Embodiment 7: A method performed by a MB-SMF (118) for a MB session join procedure, the method comprising one or more of the following: creating (FIG. 8, step 10) an MBS session context, the MBS Session Context comprising information that indicates the AMF (11).

Embodiment 8: A network node (1300) that implements a MB-SMF (118) adapted to perform the method of embodiment 7.

Embodiment 9: A method performed by a RAN node (106) for a MB session join procedure, the method comprising one or more of the following:
  receiving (FIG. 8, step 7) a MB session join request from a User Equipment, UE, (108), the MB session join request being a request to join a particular MB session;
  sending (FIG. 8, step 7) the MB session join request to an AMF (110);
  receiving (FIG. 8, step 11) a MB session join accept message from the AMF (110); and
  sending (FIG. 8, step 11) the MB session join accept message to the UE (108).

Embodiment 10: The method of embodiment 9 wherein the RAN node (106) receives, in association with interactions for the MB session, an identity (e.g., TMGI) associated with the joined MB session, and the method further comprises storing the received identity in a RAN UE context for the UE (108).

Embodiment 11: A RAN node (106) adapted to perform the method of any one of embodiments 9 or 10.

Embodiment 12: A method performed by an AMF (110) for a MB session start procedure, the method comprising one or more of the following:
  receiving (FIG. 9, step 6) a MB session start request from a MB-SMF (118), the MB session start request being a request to start a particular MB session;
  sending (FIG. 9, step 12) a MB session resource setup request to a RAN node (106);
  receiving (FIG. 9, step 14) a MB session resource setup response from the RAN node (106);
  sending (FIG. 9, step 15) an MB session start acknowledge to the MB-SMF (118).

Embodiment 13: The method embodiment 12 further comprising: responsive to receiving (FIG. 9, step 6) the MB session start request from a MB-SMF (118), performing (FIG. 9, step 7) group paging in a registration area(s) of one or more UEs (108) that have an association to the particular MB session; receiving (FIG. 9, step 9) an MBS service request from a UE (108) via a RAN node (106) responsive to performing (FIG. 9, step 7) the group paging.

Embodiment 14: The method of embodiment 13 further comprising: responsive to receiving (FIG. 9, step 9) the MBS service request from the UE (108), sending (FIG. 9, step 10), to a MB-SMF (118), a request to setup of the particular MB session.

Embodiment 15: A network node (1300) that implements an AMF (110) adapted to perform the method of any one of embodiments 12 to 14.

Embodiment 16: A method performed by a MB-SMF (118) for a MB session start procedure, the method comprising one or more of the following:
  receiving (FIG. 9, step 3) a MB session start request, the MB session start request being a request to start a particular MB session;
  sending (FIG. 9, step 6) the MB session start request to an AMF (110).

Embodiment 17: A network node (1300) that implements a MB-SMF (118) adapted to perform the method of embodiment 16.

Embodiment 18: A method performed by a RAN node (106) for a MB session start procedure, the method comprising one or more of the following:
  receiving (FIG. 9, step 12) a MB session resource setup request from an AMF (110) for a particular MB session;
  deciding (FIG. 9, step 13) to establish either PTP or PTM resources for the MB session and establishing the resources accordingly; and
  sending (FIG. 9, step 14) a MB session resource setup response to the AMF (110).

Embodiment 19: A RAN node (106) adapted to perform the method of embodiment 18.

Embodiment 20: A method performed by an AMF (110) for a MB session leave procedure, the method comprising one or more of the following:
  receiving (FIG. 10, step 2) a MB session leave message from a UE (108), the MB session leave message being a request to leave a particular MB session;
  sending (FIG. 10, step 3) a message to a RAN node (106) that informs the RAN node (106) that the UE (108) has left the particular MB session.

Embodiment 21: The method of embodiment 20 further comprising: determining that the UE (108) is a last UE in the AMF (110) for the particular MB session; and, responsive to determining that the UE (108) is a last UE in the AMF (110) for the particular MB session, sending (FIG. 10, step 5) an MB session release request to a MB-SMF (118) in order for the AMF (110) to unsubscribe to the particular MB session.

Embodiment 22: A network node (1300) that implements an AMF (110) adapted to perform the method of any one of embodiments 20 to 21.

Embodiment 23: A method performed by a RAN node (106) for a MB session leave procedure, the method comprising one or more of the following:
  receiving (FIG. 10, step 3) a MB session release message from an AMF (110), the MB session release message being for a particular UE (108) for a particular MB session;
  performing one or more actions responsive to receiving (FIG. 10, step 3) the MB session release message.

Embodiment 24: The method of embodiment 23 wherein the one or more actions comprise adjusting (FIG. 11, step 4) resources (e.g., PTP or PTM resources) utilized for the MB session at the RAN node (106).

Embodiment 25: The method of embodiment 23 wherein the one or more actions comprise: determining that the particular UE (108) is a last UE for the MB session at the RAN node (106); and, responsive to determining that the particular UE (108) is a last UE for the MB session at the RAN node (106), sending (FIG. 10, step 4a) a leave message to a MB-UPF (122) to stop an associated media stream to the RAN node (106) and stopping any ongoing PTP or PTM transmission for the MB session at the RAN node (106).

Embodiment 26: A RAN node (106) adapted to perform the method of any one of embodiments 23 to 25.

Embodiment 27: A method performed by an AMF (110) for a MB session stop procedure, the method comprising one or more of the following:
  receiving (FIG. 11, step 4) a MB session stop message from a MB-SMF (118), the MB session stop message being a request to stop a particular MB session;
  sending (FIG. 11, step 4) a MB session resource release request to a RAN node (106) for the particular MB session.

Embodiment 28: A network node (1300) that implements an AMF (110) adapted to perform the method of embodiment 27.

Embodiment 29: A method performed by a MB-SMF (118) for a MB session stop procedure, the method comprising one or more of the following:
  receiving (FIG. 11, step 3) a MB session stop message for a particular MB session;
  sending (FIG. 11, step 4) the MB session stop message to an AMF (110).

Embodiment 30: A network node (1300) that implements a MB-SMF (118) adapted to perform the method of embodiment 29.

Embodiment 31: A method performed by a RAN node (106) for a MB session leave procedure, the method comprising one or more of the following:
  receiving (FIG. 11, step 5) a MB session resource release request from an AMF (110), the MB session resource release request being for a particular MB session;
  releasing (FIG. 11, step 6) resource utilized at the RAN node (106) for the particular MB session.

Embodiment 32: A RAN node (106) adapted to perform the method of embodiment 31.

Embodiment 33: A method performed by an AMF (110) for a MB session stop procedure, the method comprising one or more of the following:
  receiving (FIG. 12, step 5) a MB session delete message from a MB-SMF (118), the MB session delete message being a request to delete a particular MB session;
  responsive to receiving (FIG. 12, step 5) the MB session delete message from the MB-SMF (118), removing an association between the AMF (110) and the particular MB session and removing an association with the particular MB session from one or more UE contexts stored at the AMF (110).

Embodiment 34: The method of embodiment 33 further comprising sending (FIG. 12, step 6) a request(s) to a RAN node(s) (106) to release resources associated with the particular MB session and/to leave the particular MB session.

Embodiment 35: A network node (1300) that implements an AMF (110) adapted to perform the method of embodiment 33 or 34.

Embodiment 36: A method performed by a MB-SMF (118) for a MB session delete procedure, the method comprising one or more of the following:

receiving (FIG. 12, step 2) a request for a particular MB session, the request being a request to delete the particular MB session;
sending (FIG. 12, step 3) a request to a MB-UPF (122) to release resources associated to the particular MB session;
sending (FIG. 12, step 4) a MB session delete message to an AMF (110), the MB session delete message being a message that requests the AMF (110) to delete the particular MB session.

Embodiment 37: A network node (1300) that implements a MB-SMF (118) adapted to perform the method of embodiment 36.

Embodiment 38: A method performed by a RAN node (106) for a MB session delete procedure, the method comprising one or more of the following:
receiving (FIG. 12, step 6), from an AMF (110), a request to release resources associated with a particular MB session;
releasing (FIG. 12, step 7) resources utilized at the RAN node (106) for the particular MB session.

Embodiment 39: A RAN node (106) adapted to perform the method of embodiment 38.

Those skilled in the art will recognize improvements and modifications to the embodiments of the present disclosure. All such improvements and modifications are considered within the scope of the concepts disclosed herein.

The invention claimed is:

1. A method performed by an Access and Mobility Management Function (AMF) for a Multicast/Broadcast (MB) session join procedure, the method comprising:
receiving a MB session join request from a User Equipment (UE) via a Radio Access Network (RAN) node, the MB session join request being a request to join a particular MB session;
determining that the MB session join request is permitted by a subscription of the UE;
selecting a MB Session Management Function (MB-SMF) based on information comprised in the MB session join request;
determining whether the UE is authorized to join the MB session, wherein determining whether the UE is authorized to join the MB session comprises providing a UE identity (ID) of the UE and a MB session ID of the particular MB session to the MB-SMF;
communicating with the MB-SMF to create a MB session context in the AMF and to add a reference to the AMF to an MB session context in the MB-SMF; and
sending a MB session join accept message to the UE.

2. The method of claim 1 wherein the MB session join request comprises the MB session ID and selecting the MB-SMF comprises selecting the MB-SMF based on the MB session ID.

3. The method of claim 2 wherein the MB session ID is a Temporary Mobile Group Identity (TMGI) associated to the particular MB session.

4. The method of claim 1, further comprising storing an identifier of the particular MB session, as a joined MB session, to a UE context of the UE stored at the AMF.

5. The method of claim 1, further comprising allocating an identity used to page the UE when the UE is in an idle state when a specific service associated to the particular MB session starts.

6. The method of claim 5 wherein the allocated identity is a Temporary Mobile Group Identity (TMGI) associated to the particular MB session or a group page identity associated to the TMGI.

7. The method of claim 5 further comprising storing the allocated identity in either the MB session context or a UE context of the UE stored at the AMF.

8. The method of claim 1, wherein the MB session context in the MB-SMF comprises information that indicates the AMF.

9. The method of claim 1, wherein the MB session join procedure does not involve setup of individual user plane resources for the UE.

10. A network node that implements an Access and Mobility Management Function (AMF) for a Multicast/Broadcast (MB) session join procedure, the network node comprising:
processing circuitry,
wherein the processing circuitry is configured to cause the network node to:
receive a MB session join request from a User Equipment (UE) via a Radio Access Network (RAN) node, the MB session join request being a request to join a particular MB session;
determine that the MB session join request is permitted by a subscription of the UE;
select a MB Session Management Function (MB-SMF) based on information comprised in the MB session join request;
determine whether the UE is authorized to join the MB session, wherein determining whether the UE is authorized to join the MB session comprises providing a UE identity (ID) of the UE and a MB session ID of the particular MB session to the MB-SMF;
communicate with the MB-SMF to create a MB session context in the AMF and to add a reference to the AMF to an MB session context in the MB-SMF; and
send a MB session join accept message to the UE.

11. A method performed by a Multicast/Broadcast Session Management Function (MB-SMF) for a MB session join procedure, the method comprising:
communicating with an Access and Mobility Management Function (AMF) to update a MB session context in the MB-SMF during a join procedure in which a User Equipment (UE) joins a particular MB session, the MB session Context comprising information that indicates the AMF;
receiving, from the AMF, a UE identity (ID) of the UE and a MB session ID of the particular MB session;
determining whether the UE is authorized to join the particular MB session based on the UE ID and the MB session ID, comprising determining not to establish a Protocol Data Unit (PDU) Session if a request for the UE to join the particular MB session is invalid; and
sending a response to the AMF that indicates whether the UE is authorized to join the particular MB session.

12. The method of claim 11 wherein determining whether the UE is authorized to join the particular MB session comprises:
determining whether the request for the UE to join the particular MB session is compliant with a subscription associated to the UE and with local policies; or
determining whether the UE is eligible to join a service associated with the MB session ID of the particular MB session; or
determining whether the UE is located within a service area in which UEs are eligible to join the particular MB session, based on a location of the UE.

13. The method of claim 11 further comprising:
sending, towards an Application Server (AS), via a Network Exposure Function (NEF) or a Multicast Broadcast Service Function (MBSF), a message comprising the UE ID and the MB session ID to request authorization; and receiving, from the application server, a response that indicates whether the UE is authorized to join the particular MB session.

14. A network node that implements a Multicast/Broadcast Session Management Function (MB-SMF) for a Multicast/Broadcast (MB) session join procedure, the network node comprising:

processing circuitry, wherein the processing circuitry is configured to cause the network node to:

communicate with an Access and Mobility Management Function (AMF) to update a MB session context in the MB-SMF during a join procedure in which a User Equipment (UE) joins a particular MB session, the MB session Context comprising information that indicates the AMF;

receive, from the AMF, a UE identity (ID) of the UE and a MB session ID of the particular MB session;

determine whether the UE is authorized to join the particular MB session based on the UE ID and the MB session ID, comprising determining not to establish a Protocol Data Unit (PDU) Session if a request for the UE to join the particular MB session is invalid; and send a response to the AMF that indicates whether the UE is authorized to join the particular MB session.

15. The method of claim 11 wherein determining whether the UE is authorized to join the particular MB session comprises determining whether the request for the UE to join the particular MB session is compliant with a subscription associated to the UE and with local policies.

16. The method of claim 11 wherein determining whether the UE is authorized to join the particular MB session comprises determining whether the UE is eligible to join a service associated with the MB session ID of the particular MB session.

17. The method of claim 11 wherein determining whether the UE is authorized to join the particular MB session comprises determining whether the UE is located within a service area in which UEs are eligible to join the particular MB session, based on a location of the UE.

* * * * *